United States Patent
Saito et al.

(10) Patent No.: US 8,091,064 B2
(45) Date of Patent: Jan. 3, 2012

(54) SUPPORTING SYSTEM, DESIGN SUPPORTING METHOD, AND COMPUTER-READABLE RECORDING MEDIUM RECORDED WITH DESIGN SUPPORTING PROGRAM

(75) Inventors: Masahiko Saito, Kanagawa (JP); Kenji Ejima, Fukuoka (JP); Ryo Yokoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1280 days.

(21) Appl. No.: 11/783,987

(22) Filed: Apr. 13, 2007

(65) Prior Publication Data

US 2007/0245294 A1    Oct. 18, 2007

(30) Foreign Application Priority Data

Apr. 14, 2006    (JP) .................................. 2006-111760

(51) Int. Cl.
*G06F 17/50*    (2006.01)
(52) U.S. Cl. ........................................................ 716/138
(58) Field of Classification Search .................... 716/138
See application file for complete search history.

(56) References Cited

U.S. PATENT DOCUMENTS

| | | | |
|---|---|---|---|
| 6,460,172 B1 * | 10/2002 | Insenser Farre et al. | 326/38 |
| 6,691,301 B2 * | 2/2004 | Bowen | 717/114 |
| 7,139,985 B2 | 11/2006 | Jones | |
| 7,669,164 B1 * | 2/2010 | Ma et al. | 716/138 |
| 2002/0162097 A1 | 10/2002 | Meribout | |
| 2005/0192929 A1 | 9/2005 | Sumi | |

FOREIGN PATENT DOCUMENTS

| | | |
|---|---|---|
| JP | 11-232081 | 8/1999 |
| JP | 2002-123563 | 4/2002 |
| JP | 2003-288378 | 10/2003 |
| JP | 2005-301985 | 10/2005 |

OTHER PUBLICATIONS

Shinya Honda, Development of a tool for generating an interface between software and hardware: software-hardware co-designing, accomplishment report collection in 2003, published by the Information-Technology Promotion Agency, Japan (unexplored Software Division) with English translation.
David C. Fallside et al., XML Schema Part ): Primer Second Edition, W3C Recommendation, Oct. 28, 2004.

* cited by examiner

*Primary Examiner* — Jack Chang
*Assistant Examiner* — Brandon Bowers
(74) *Attorney, Agent, or Firm* — Wenderoth Lind & Ponack, L.L.P.

(57) ABSTRACT

An optimum target system is designed by implementing software modules and hardware modules, without discriminating between the software modules and the hardware modules. An external storage stores the software modules including namespace identifiers for identifying the software modules, and the hardware modules including namespace identifiers for identifying the hardware modules. A module selector specifies a process of a target system to be built, and selects the software modules and the hardware modules that execute the specified process. A namespace manager acquires the namespace identifiers for identifying the software modules, and the namespace identifiers for identifying the hardware modules. A module mapping processor implements either one of the software modules and the hardware modules in the target system, based on the namespace identifiers.

18 Claims, 14 Drawing Sheets

| PROCESS REQUESTOR | PROCESS REQUESTEE | NAMESPACE | MAPPING METHOD |
|---|---|---|---|
| SOFTWARE | SOFTWARE | FUNCTION CALL | (1) STORE ARGUMENT IN STACK<br>(2) EXECUTE SUBROUTINE CALL<br>(3) ACQUIRE PROCESSING RESULT FROM MEMORY OR REGISTER — 700 |
| | | MESSAGE TRANSMISSION | (1) TRANSMIT MESSAGE<br>(2) PROCEED TO MESSAGE RECEIVING WAIT STATE<br>(3) ACQUIRE PROCESSING RESULT FROM RECEIVED MESSAGE — 701 |
| SOFTWARE | HARDWARE | INTERRUPT WAITING | (1) STORE ARGUMENT IN REGISTER<br>(2) ACTIVATE HARDWARE BY STORING COMMAND IN CONTROL REGISTER<br>(3) PROCEED TO INTERRUPT WAITING STATE<br>(4) ACQUIRE PROCESSING RESULT FROM REGISTER — 702 |
| | | POLLING | (1) STORE ARGUMENT IN REGISTER<br>(2) ACTIVATE HARDWARE BY STORING COMMAND IN CONTROL REGISTER<br>(3) POLL STATE REGISTER UNTIL PROCESS COMPLETION<br>(4) ACQUIRE PROCESSING RESULT FROM REGISTER — 703 |
| HARDWARE | SOFTWARE | INTERRUPT | (1) SET ARGUMENT IN REGISTER<br>(2) ACTIVATE SOFTWARE BY CAUSING INTERRUPT<br>(3) RESUME PROCESS UNDER CONDITION THAT REGISTER WRITING IS EXECUTED FOR ACQUIRING PROCESSING RESULT — 704 |
| HARDWARE | HARDWARE | BUFFER | (1) WRITE ARGUMENT IN INPUT BUFFER<br>(2) ACQUIRE PROCESSING RESULT FROM OUTPUT BUFFER — 705 |

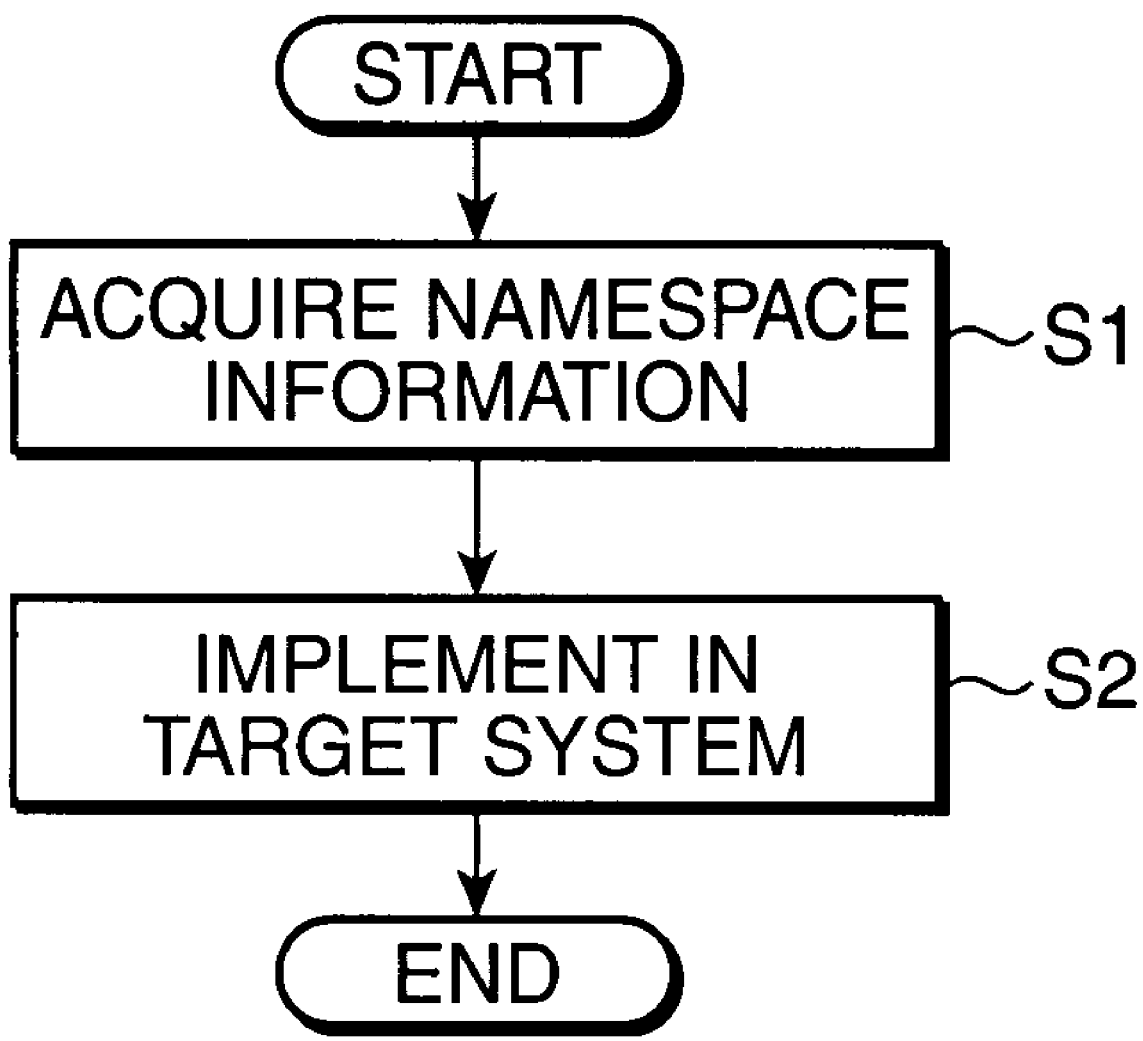

FIG.10

| PROCESS REQUESTOR | PROCESS REQUESTEE | OTHER INFORMATION | CONDITION | NAMESPACE | |
|---|---|---|---|---|---|
| SOFTWARE | SOFTWARE | INTERFACE ATTRIBUTE | PRIVATE | FUNCTION CALL | ~900 |
| | | | PUBLIC | MESSAGE TRANSMISSION | ~901 |
| SOFTWARE | HARDWARE | PROCESSING TIME | PROCESSING TIME > PRESET VALUE | INTERRUPT WAITING | ~902 |
| | | | PROCESSING TIME ≦ PRESET VALUE | POLLING | ~903 |
| HARDWARE | SOFTWARE | — | — | INTERRUPT | ~904 |
| HARDWARE | HARDWARE | — | — | BUFFER | ~905 |

411

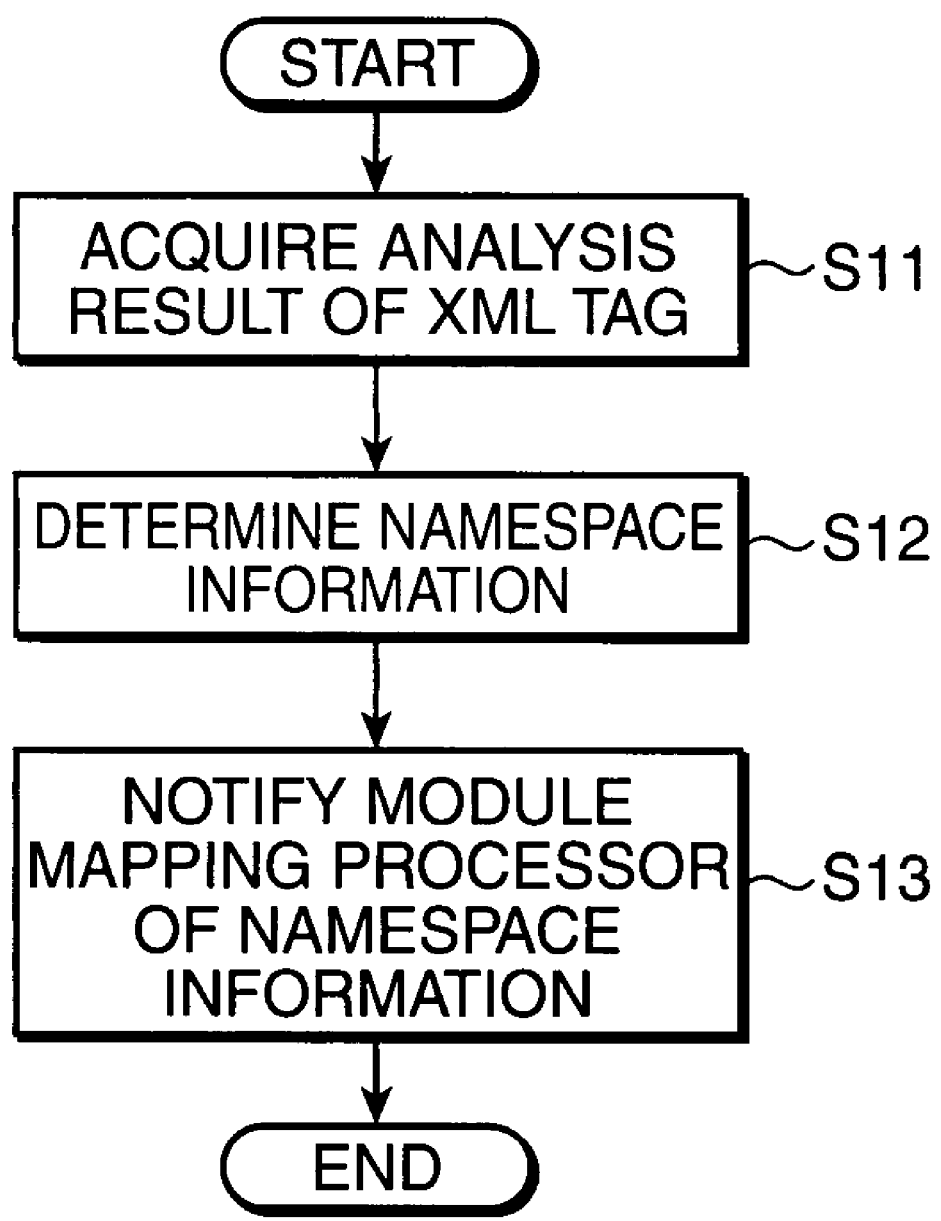

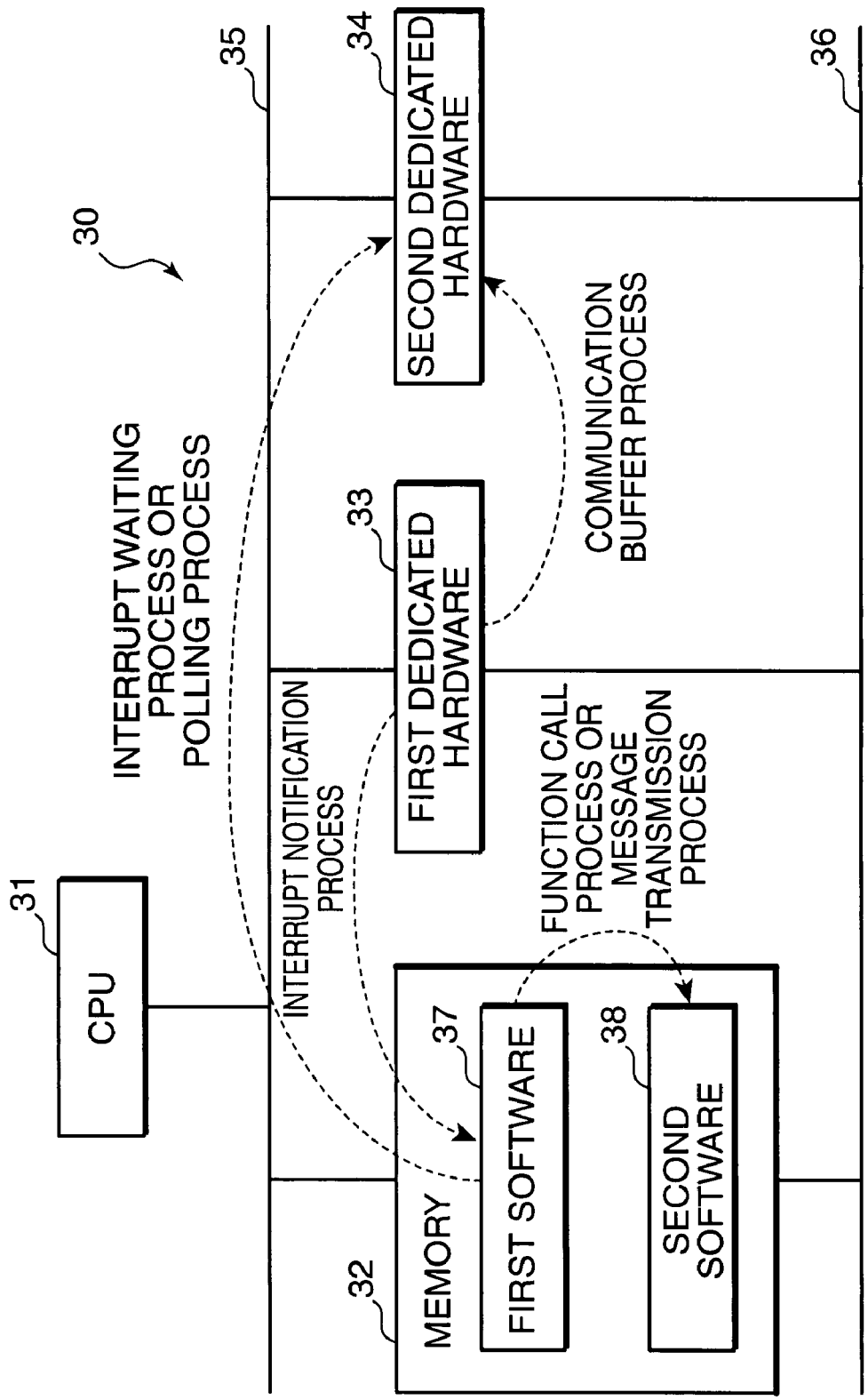

SUPPORTING SYSTEM, DESIGN SUPPORTING METHOD, AND COMPUTER-READABLE RECORDING MEDIUM RECORDED WITH DESIGN SUPPORTING PROGRAM

BACKGROUND OF THE INVENTION

1. Field of the Invention

The present invention relates to a design supporting system for supporting the design of a target system to be built by implementing at least one software module, and at least one hardware module, a design supporting method, and a computer-readable recording medium recorded with a design supporting program.

2. Description of the Background Art

There is known a technology relating to an integrated design environment for building a system by implementing hardware modules as disclosed in e.g. Japanese Unexamined Patent Publication No. 2002-123563 (first reference). The first reference discloses a method to perform a syntax-analysis of a description file of an electronic circuit model described in a high-level description language to generate a control-data-flow-graph. The control-data-flow-graph is divided into threads each composed of a set of a plurality of connected nodes. The divided threads are optimized to meet with circuit area size constraints and timing constraints so as to obtain designation information of the number, the function, the placement, and the routing of logic cells i.e. hardware modules concerning the electronic circuit model.

There is also known a technology relating to a system for managing software modules as disclosed in e.g. Japanese Unexamined Patent Publication No. 2005-301985 (second reference). The information processor disclosed in the second reference has a plurality of objects, and an object generating means for managing the objects. Each of the objects has an attribute information managing means for managing attribute information by associating attribute names with attribute values, and a common interface for accepting requests on setting and acquisition of the attribute information. The object generating means sets the attribute information corresponding to the type of the generated object to the object.

There is also known a technology of building a system by implementing a software module and a hardware module, as disclosed in "Development of a tool for generating an interface between software and hardware: software-hardware co-designing" (third reference) written by Shinya Honda, accomplishment report collection in 2003, published by the Information-Technology Promotion Agency, Japan (Unexplored Software Division). The third reference recites an approach of reading a description file of an object to be designed, classifying the description file into three parts i.e. a part used for a hardware module, a part used for a software module, and a part used for an interface between the hardware and the software modules, and automatically generating the interface.

In recent years, in the technical field of embedded computers such as information appliances or cellular phones, where complex and versatile design is increasingly demanded, it is essential to build a system in a short term, while satisfying constraints such as circuit area size, timing, performance, and power consumption. It is necessary to establish a technology of selecting modules satisfying the constraints from a plurality of hardware modules and a plurality of software modules for implementation to satisfy the constraints which conflict with each other, such as circuit area size, performance, and power consumption. For instance, it is necessary to select a software module in emphasizing cost reduction, to select a hardware module in emphasizing performance, and to implement the selected modules. Specifically, in a design supporting system having a plurality of hardware modules and a plurality of software modules, it is required to properly select the modules satisfying the constraints, and to allow the selected modules to be implemented with latitude.

The arrangement recited in the first reference is directed to building a system by implementing solely hardware modules, with no implementation of a software module. Contrary to this, the arrangement recited in the second reference is directed to a technology of implementing solely software modules. The arrangements recited in the first and second references are related to technologies of building systems by implementing hardware modules, and implementing software modules, respectively. These arrangements cannot be applied to building an embedded computer system which is built with both software modules and hardware modules. In particular, since an interface for a hardware module, and an interface for a software module are generally different from each other, intended implementation of a software module and a hardware module cannot be realized, even if intended implementation of solely hardware modules, and implementation of solely software modules are realized.

The arrangement recited in the third reference is directed to an approach of dividing one system description into a software module and a hardware module, and generating an interface for the software module and an interface for the hardware module as an interrupt synchronization mechanism. This is a closest approach applicable to the technical field of embedded computers. However, the arrangement of the third reference is proposed simply for implementing a software module and a hardware module. If the software module is changed to a hardware module due to a constraint on the performance, or if the hardware module is changed to a software module due to a constraint on the production cost, the interfaces between the software module and the hardware module are meaningless.

In other words, the first through the third references disclose technologies of fixedly providing interfaces between software modules, interfaces between hardware modules, or interfaces between a software module and a hardware module, and do not suggest an idea of changing the interfaces depending on the constraints. For instance, in the case where a software module is replaced by a hardware module, it is necessary to change the interfaces between the relevant modules, i.e. to re-design a system.

SUMMARY OF THE INVENTION

In view of the above problems residing in the conventional examples, it is an object of the present invention to provide a design supporting system that enables to design an optimum target system by implementing software modules and hardware modules, without discriminating the software modules and the hardware modules one from the other, as well as a design supporting method, and a computer-readable recording medium recorded with a design supporting program.

A design supporting system according to an aspect of the invention is a design supporting system for supporting the design of a target system to be built by implementing at least one software module and at least one hardware module. The design supporting system comprises: a module storage for storing at least one software module including a namespace identifier for identifying the software module, and at least one hardware module including a namespace identifier for identifying the hardware module; a module selector for specifying a process of a target system to be built, and selecting the software modules and the hardware modules that execute the specified process from the module storage; a namespace identifier acquirer for acquiring the namespace identifier for identifying the software module selected by the module selector, and the namespace identifier for identifying the hardware module selected by the module selector; and an implementer for implementing either one of the software modules and the hardware modules in the target system, based on the namespace identifiers acquired by the namespace identifier acquirer.

A design supporting method according to another aspect of the invention is a design supporting method for supporting the design of a target system to be built by implementing at least one software module and at least one hardware module, wherein software modules including a namespace identifier for identifying the software module, and hardware modules including a namespace identifier for identifying the hardware module are stored in a module storage. The design supporting method comprises: a module selecting step of specifying a process of a target system to be built, and selecting the software modules and the hardware modules that execute the specified process from the module storage; a namespace identifier acquiring step of acquiring the namespace identifier for identifying the software module selected in the module selecting step, and the namespace identifier for identifying the hardware module selected in the module selecting step; and an implementing step of implementing either one of the software modules and the hardware modules in the target system, based on the namespace identifiers acquired in the namespace identifier acquiring step.

A computer-readable recording medium recorded with a design supporting program according to yet another aspect of the invention is a computer-readable recording medium recorded with a design supporting program for supporting the design of a target system to be built by implementing at least one software module and at least one hardware module. The design supporting program causes a computer to function as: a module selecting means for specifying a process of a target system to be built, and selecting software modules and hardware modules that execute the specified process by referring to a module storage storing the software modules including a namespace identifier for identifying the software module, and the hardware modules including a namespace identifier for identifying the hardware module; a namespace identifier acquiring means for acquiring the namespace identifier for identifying the software module selected by the module selecting means, and the namespace identifier for identifying the hardware module selected by the module selecting means; and an implementing means for implementing either one of the software modules and the hardware modules in the target system, based on the namespace identifiers acquired by the namespace identifier acquiring means.

These and other objects, features and advantages of the present invention will become more apparent upon reading the following detailed description along with the accompanying drawing.

BRIEF DESCRIPTION OF THE DRAWINGS

FIG. 8 is a chart showing a representative example of a mapping method to be executed in a module mapping process in accordance with namespace information acquired in a namespace management process.
FIG. 9 is a flowchart showing a process procedure of the module mapping process.
FIG. 10 is a chart for describing a namespace specifying process of specifying the namespace information.
FIG. 11 is a flowchart showing the namespace management process.
FIG. 15 is a diagram showing an example of a configuration of a target system i.e. an embedded system built by the design supporting system according to the embodiment.

DETAILED DESCRIPTION OF THE INVENTION

Figure 1:
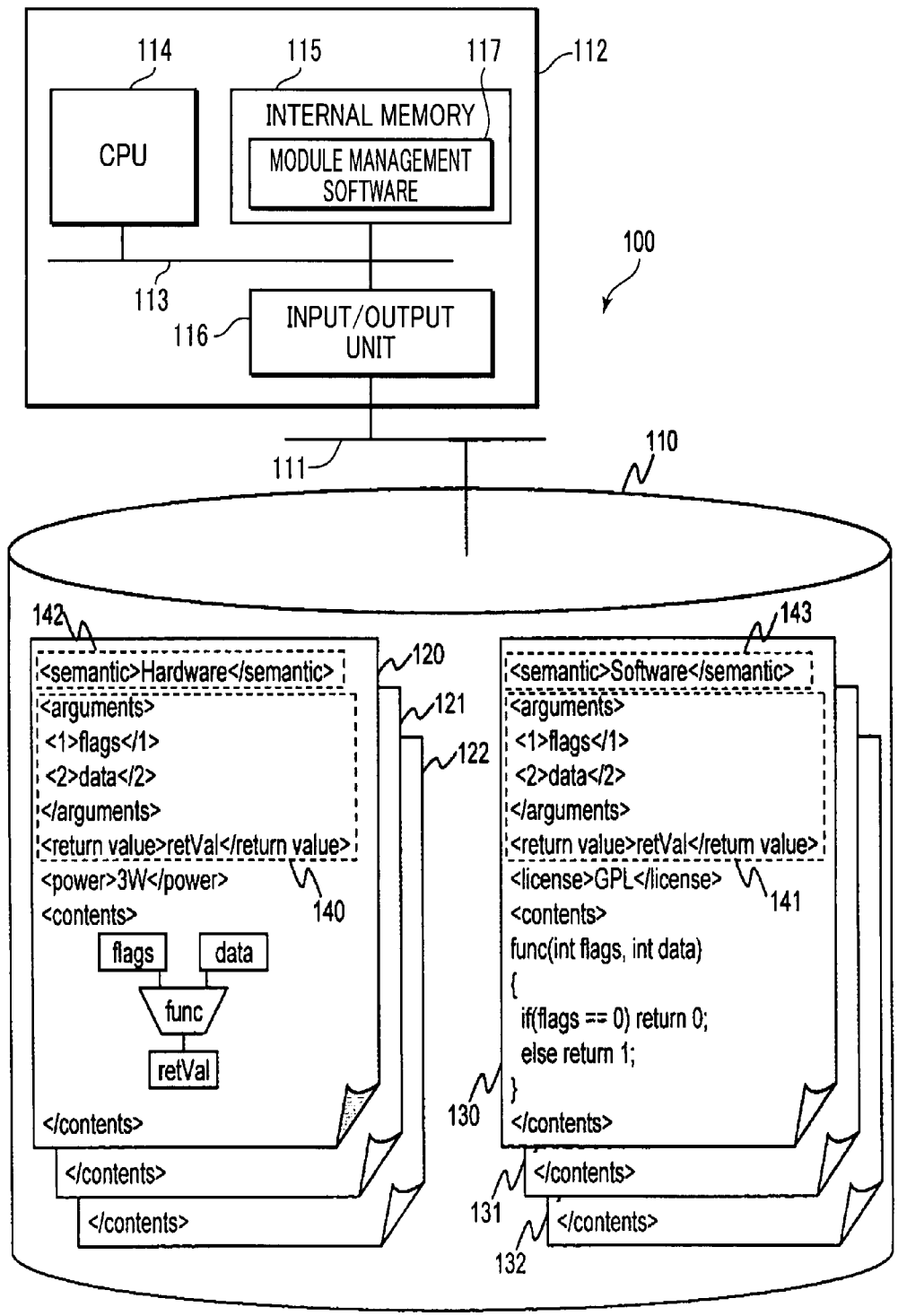
FIG. 1 is a diagram showing an entire configuration of a design supporting system embodying the invention.

In the following, an embodiment of the invention is described referring to the drawings. It should be appreciated that the following embodiments are merely examples embodying the invention, and do not limit the technical scope of the invention.

FIG. 1 is a diagram showing a configuration example of a design supporting system embodying the invention. The design supporting system 100 represents the entirety of a design supporting system for managing hardware modules and software modules in the technical field of embedded computers. The design supporting system 100 includes an external storage 110 and a database processor 112 connected to each other by a network 111. The external storage 110 is a large-capacity storage device utilizing a hard disk, an optical disk, or the like. FIG. 1 shows one database processor 112. If, however, large-scale data is processed, it is possible to apply a high-speed processing technology by allowing plural database processors 112 to process in parallel.

The database processor 112 is a general information processor, and includes a CPU (Central Processing Unit) 114, an internal memory 115, and an input/output unit 116. The CPU 114, the internal memory 115, and the input/output unit 116 are each connected to an internal bus 113. The input/output unit 116 is a network connector, and is adapted to refer to storage contents of the external storage 110 via the network 111. A module management software 117 is stored in the internal memory 115. The CPU 114 sequentially reads instructions of the module management software 117 for execution of the instructions. The module management software 117 is a software for managing the entirety of the design supporting system 100, and has functions of managing, selecting, and mapping hardware modules 120, 121, and 122, and software modules 130, 131, and 132, which are stored in the external storage 110. The processing contents of the module management software 117 will be described in a section referring to FIG. 4 and thereafter.

The hardware modules 120 through 122, and the software modules 130 through 132 respectively include circuit diagrams of the hardware modules, and source codes or contents of object files of the software modules. The details of the hardware modules and the software modules are described referring to FIGS. 2 and 3. Referring to FIG. 1, the hardware module 120 and the software module 130 respectively represent a hardware circuit and a software module which execute processes identical to each other. In this case, an interface 140 for the hardware module, and an interface 141 for the software module are descriptions identical to each other. Normally, an interface for a hardware module is, as recited in the third reference, executed by interrupt or register access, and an interface for a software module is, as recited in the second reference, executed by function call or message communication. In this embodiment, the interfaces are made identical to each other. With this arrangement, the module management software 117 is capable of integrally managing software modules and hardware modules, and properly selecting required modules. In FIG. 1, identifiers for identifying the hardware module and the software module are namespace identifiers 142 and 143, respectively. A module identified by the namespace identifier 142 represents a module in a hardware space, and a module identified by the namespace identifier 143 represents a module in a software space.

Figure 2:
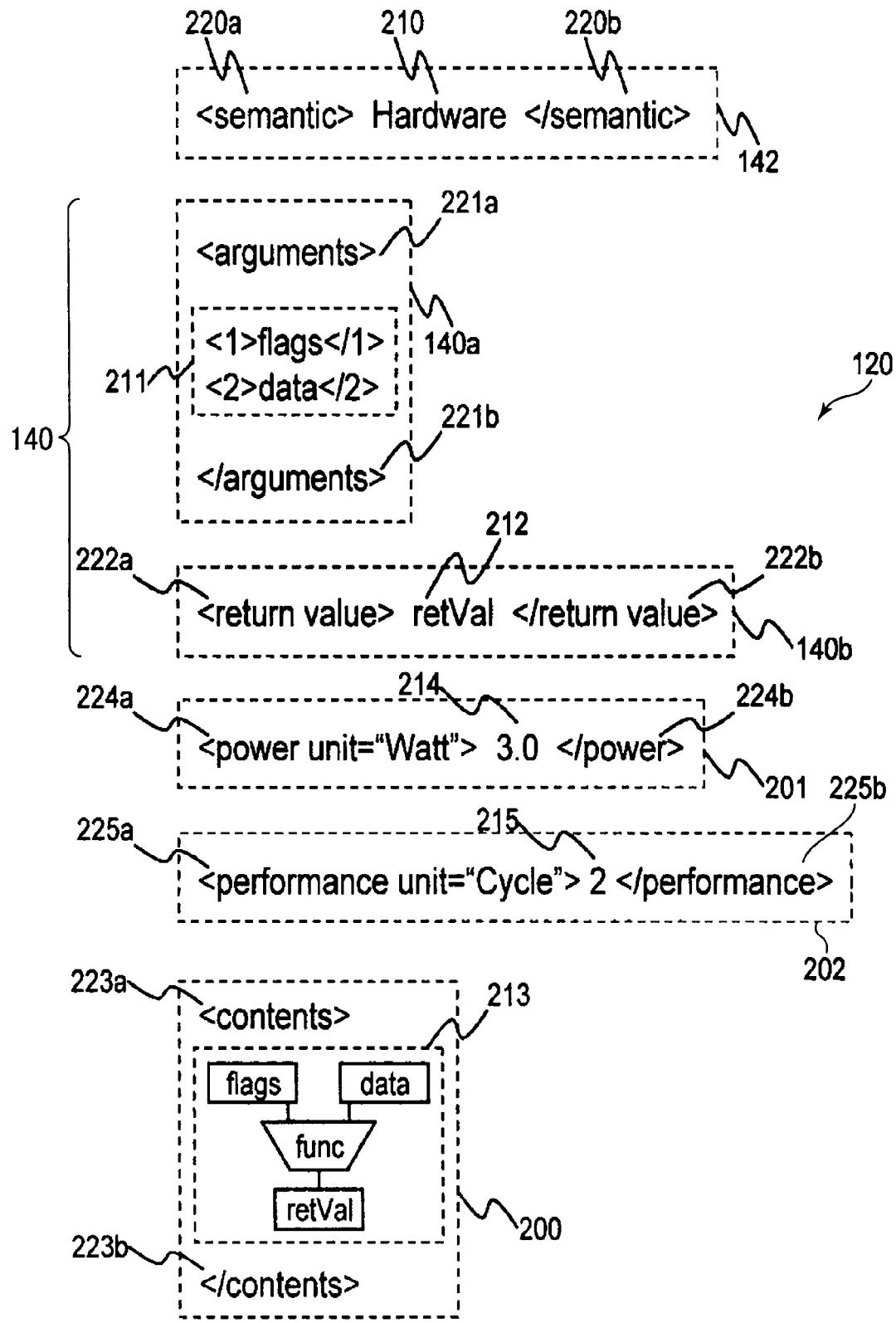
FIG. 2 is a diagram for describing in detail an internal configuration of a hardware module.

FIG. 2 is a diagram for describing in detail an internal configuration of the hardware module 120. In this embodiment, the hardware module 120 is described in a common language such as XML (Extensible Markup Language). Alternatively, a tag language other than the common language may be used. As will be described later referring to FIG. 4, however, it is desirable to describe in XML, which makes it easy to change the contents to be processed with respect to a specific tag by namespace definition, because the meaning of data designated by the specific tag is changed by an XML schema and a namespace management process.

The hardware module 120 includes the namespace identifier 142, the interface 140, power consumption information 201, processing speed information 202, and a circuit configuration describer 200. The namespace identifier 142 has a start tag 220*a*, an end tag 220*b*, and a namespace code 210 between the start tag 220*a* and the end tag 220*b*. In the following, similarly to the above, in the case where the below-mentioned items are described in XML, all the items are described by combination of a start tag, data, and an end tag in accordance with the XML grammar. The interface 140 generally includes an input interface section 140*a* and an output interface section 140*b*. Alternatively, either one of the input interface section 140*a* and the output interface section 140*b* may be used as an interface, depending on the type of a module.

The input interface section 140*a* has a start tag 221*a*, an end tag 221*b*, and an argument group 211 between the start tag 221*a* and the end tag 221*b*. Similarly, the output interface section 140*b* has a start tag 222*a*, an end tag 222*b*, and are turn value group 212 between the start tag 222*a* and the end tag 222*b*. There is a case that the argument group 211 may be composed of a plurality of arguments, and the return value group 212 may be composed of a plurality of return values. In this embodiment, the module is described under a condition that there are two arguments and one return value. If the argument group 211 is composed of a plurality of arguments, it is possible to distinguish the individual arguments such as a first argument and a second argument by XML tags.

The circuit configuration describer 200 is a description in which an actual circuit diagram is described in the hardware module 120. Similarly to the above, the circuit configuration describer 200 has a start tag 223*a*, an end tag 223*b*, and a circuit diagram 213 between the start tag 223*a* and the end tag 223*b*. In FIG. 2, the circuit diagram 213 is written in terms of a block diagram for easy understanding. In an actual practice, the circuit diagram may be directly described in a hardware description language such as RTL (Register Transfer Level) language or SystemC language, or a link to a description file.

The interface 140 i.e. the input interface section 140*a* and the output interface section 140*b*, the namespace identifier 142, and the circuit configuration describer 200 define an external operation specification and an internal operation specification of the hardware module 120. By utilizing XML as a meta language for defining a markup language describing data, attribute information to be used as a reference in selecting the hardware module 120 can be additionally described. The power consumption information 201 and the processing speed information 202 correspond to the attribute information. The power consumption information 201 represents an electric power to be consumed in the case where the circuit diagram 213 is implemented. Similarly to the above, the power consumption information 201 has a start tag 224*a*, an end tag 224*b*, and a power consumption estimative value 214 between the start tag 224*a* and the end tag 224*b*. The start tag 224*a* defines that the unit of the power consumption information 201 is "watt", utilizing a merit of the XML description.

The processing speed information 202 represents a processing speed in the case where the circuit diagram 213 is implemented. Similarly to the power consumption information 201, the processing speed information 202 has a start tag 225*a*, an end tag 225*b*, and a processing time 215 between the start tag 225*a* and the end tag 225*b*. The start tag 225*a* defines that the unit of the processing time is "cycle". The power consumption information 201 and the processing speed information 202 are not actually utilized in implementing the hardware module 120 in a system, but are utilized in a case that there are a plurality of hardware modules and a plurality of software modules which execute a process identical to each other, and a module is selected based on a power consumption constraint or a timing constraint. FIG. 2 shows a case that solely the power consumption information 201 and the processing speed information 202 are designated. Alternatively, circuit area size information or the like may be additionally described in the case where a hardware module is implemented in a system.

Figure 3:
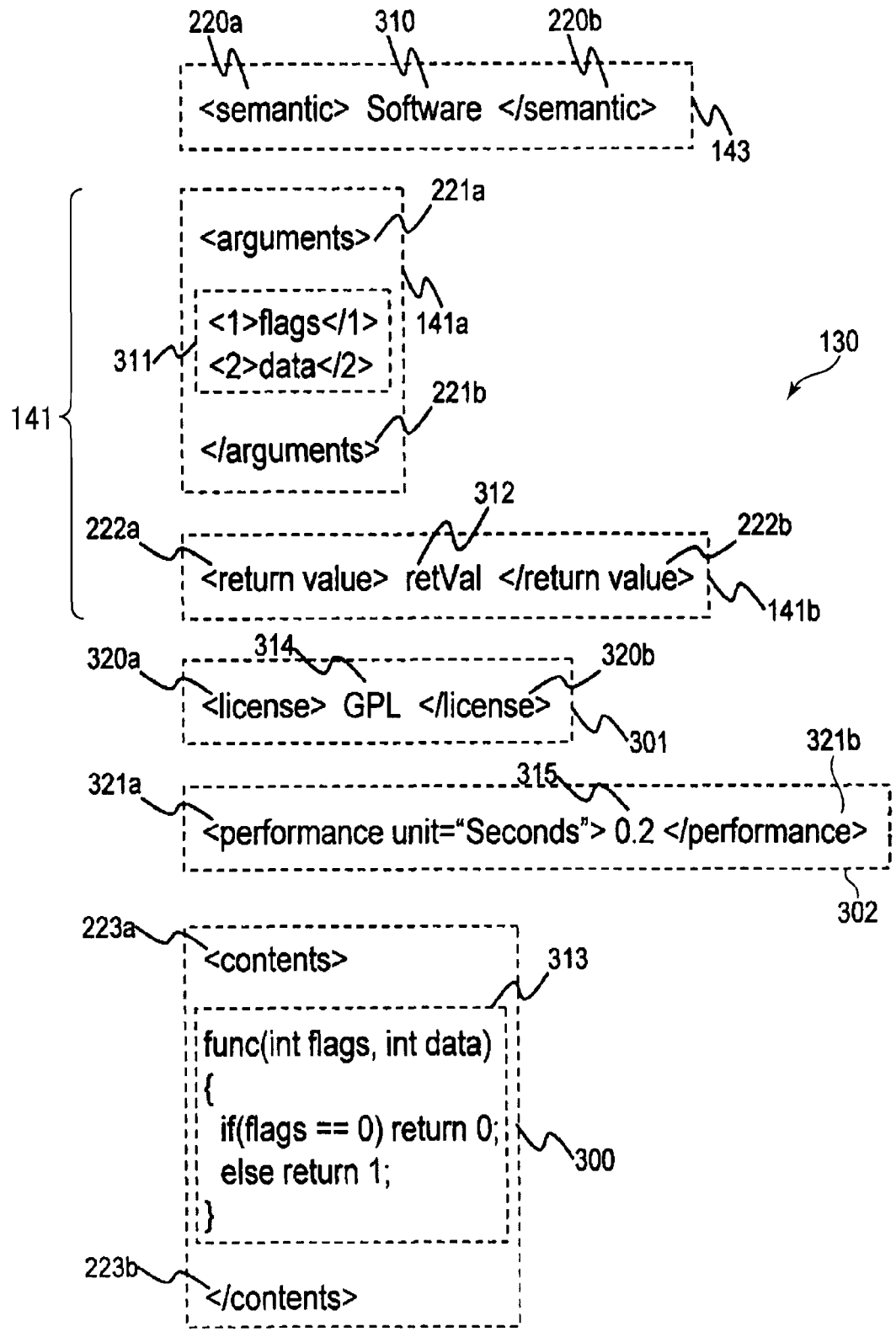
FIG. 3 is a diagram for describing in detail an internal configuration of a software module.

FIG. 3 is a diagram for describing in detail an internal configuration of the software module 130. Referring to FIG. 3, elements of the software module 130 having identical reference numerals to those of the hardware module 120 indicate the same contents as those of the hardware module 120. Similarly to the hardware module 120, the software module 130 is described in XML.

The software module 130 includes the namespace identifier 143, the interface 141, license information 301, processing speed information 302, and a program describer 300. Similarly to the hardware module 120, the software module 130 has the namespace identifier 143. The namespace identifier 143 has a start tag 220*a* and an end tag 220*b*, which are identical to corresponding ones of a hardware module and a software module other than the software module 130. However, since the software module 130 is a software module, the software module 130 uses a namespace code 310 different from the namespace code 210. The interface 141 includes an input interface section 141a and an output interface section 141b.

The input interface section 141a has a start tag 221a, an end tag 221b, and an argument group 311 between the start tag 221a and the end tag 221b. Similarly, the output interface section 141b has a start tag 222a, an end tag 222b, and a return value group 312 between the start tag 222a and the end tag 222b. The interface 141 i.e. the input interface section 141a and the output interface section 141b of the software module 130 is described in a format common to the format of the hardware module 120. In the case where the same functions are implemented in the hardware module 120 and in the software module 130, the tags and the contents of the interface 141 are the same as those of the hardware module.

The program describer 300 is a description, in which an actual program of the software module 130 is described. Similarly to the above, the program describer 300 has a start tag 223a, an end tag 223b, and a program code 313 between the start tag 223a and the end tag 223b. The program code 313 is described in a source code for easy understanding. In an actual practice, the program code 313 may be described in an object code, or a link to a source code file or an object file.

The interface 141 i.e. the input interface section 141a and the output interface section 141b, the namespace identifier 143, and the program describer 300 define an external operation specification and an internal operation specification of the software module 130. Similarly to the hardware module 120, attribute information such as the license information 301 and the processing speed information 302 is additionally described in the software module 130. Circuit area size information and power consumption information are not provided in the software module 130.

The license information 301 has a start tag 320a, an end tag 320b, and license information contents 314 between the start tag 320a and the end tag 320b. The license information contents 314 in the embodiment shows that the software module 130 is under the management of GPL (GNU Public License). By utilizing the XML description, the module management software 117 may be loaded with a function of disclosing the source code if the license information contents 314 represents "GPL".

The processing speed information 302 represents a processing speed when the program code 313 is activated. The processing speed information 302 has a start tag 321a, an end tag 321b, and a processing time 315 between the start tag 321a and the end tag 321b. Since the processing time 315 is a time required for running a program, it is not possible to define the processing time precisely in the unit of cycle. Accordingly, the start tag 321a defines that the unit of the processing time is "seconds".

As described above, by providing namespace information in the software module and the hardware module, and by making the interfaces for the hardware module and the software module identical to each other, the software module and the hardware module can be handled as identical modules, irrespective of a condition that a means for realizing a system is a software module or a hardware module. Although the interfaces for the software module and the hardware module are identical descriptions, different mappings are executed in a final stage of designing by using the namespace information. In building an embedded computer system by selecting modules, a system may be designed solely based on an interface specification. With this arrangement, there is no need of considering, in a stage of designing a system, whether the system is realized by mapping a software module or a hardware module.

Figure 4:
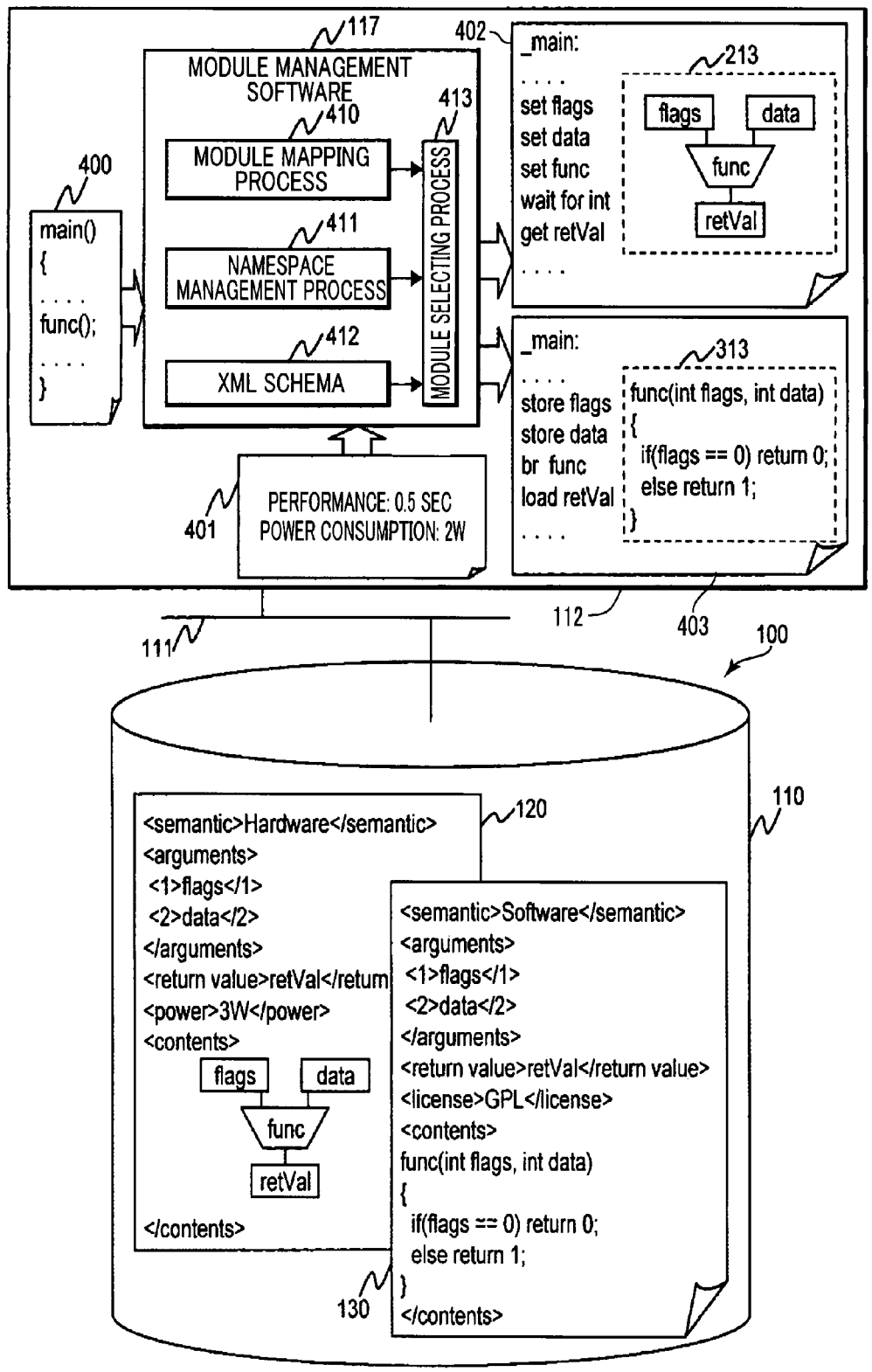
FIG. 4 is a conceptual diagram showing a processing method of the design supporting system in mapping the hardware module and the software module embodying the invention in an actual embedded computer system.

FIG. 4 is a conceptual diagram showing a process to be executed by the design supporting system 100 in mapping the hardware module 120 and the software module 130 in an actual embedded computer system. The reference numerals identical from FIGS. 1 through 3 denote the same configuration and the same data from FIGS. 1 through 3.

An application 400 is a target application to be implemented with use of the design supporting system 100 embodying the invention. The application 400 is mapped to a target system 402 or 403 in accordance with a constraint or constraints designated by a constraint file 401. The application 400 is described as a simplified software in FIG. 4. Actually, however, the application 400 is an embedded computer system serving as an application. In other words, the application 400 itself is composed of software modules and hardware modules, and refers to the other hardware modules and software modules stored in the external storage 110.

The module management software 117 includes a module mapping process 410, a namespace management process 411, an XML schema 412, and a module selecting process 413. The XML schema 412 is generally a program of performing a syntax analysis of an XML document, and is adapted to interpret and extract XML tags such as the start tags 220a through 225a, 320a, and 321a, and the end tags 220b through 225b, 320b, and 321b. General description on the XML schema 412 is recited in e.g. "David C. Fallside, Priscilla Walmsley, XML Schema Part 0: Primer Second Edition, W3C Recommendation, 28 Oct., 2004".

If an output from the XML schema 412 is directly inputted to the module mapping process 410, correct mapping is impossible as mentioned above. In view of this, the namespace management process 411 is applied to the output from the XML schema 412. The namespace management process 411 makes conversion into a sequence comprised of e.g. (1) setting an argument to a register, (2) activating a hardware module, (3) waiting for interrupt to obtain a processing result, and (4) extracting a return value from the register, in making reference from a module in the software space or an application to a module in the hardware space, even if the modules have the same argument group and the same return value group. The sequence differs depending on a condition that a referrer module is in the software space or in the hardware space, and on a condition that a referee module is in the software space or in the hardware space, which will be described later in detail referring to FIG. 8.

The module selecting process 413 has a role of comparing a constraint defined in the constrain file 401 with a specification value such as a power consumption, a circuit area size, or a processing time concerning the implemented target system, and re-selecting an optimum module, according to needs.

Figure 5:
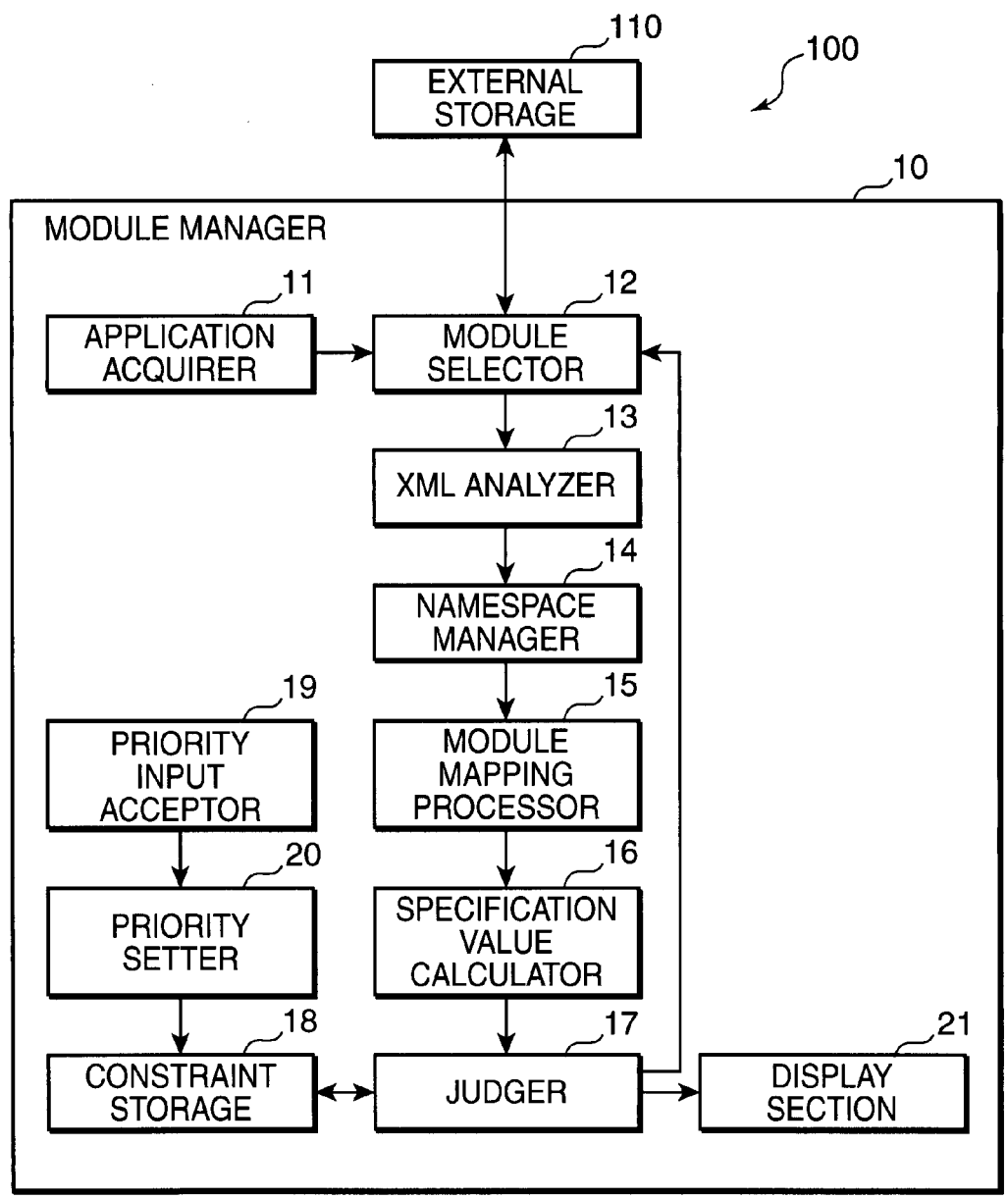
FIG. 5 is a block diagram showing a configuration of the design supporting system according to the embodiment.

In the following, the configuration of the design supporting system 100 is described in detail. FIG. 5 is a block diagram showing the configuration of the design supporting system embodying the invention. The design supporting system 100 has the external storage 110 and a module manager 10. The module manager 10 is realized when the CPU 114 executes the module management software 117.

The module manager 10 includes an application acquirer 11, a module selector 12, an XML analyzer 13, a namespace manager 14, a module mapping processor 15, a specification value calculator 16, a judger 17, a constraint storage 18, a priority input acceptor 19, a priority setter 20, and a display section 21.

The application acquirer 11 acquires the application 400 representing the target system to be built. The application acquirer 11 is operative to read the predetermined application 400 created by e.g. a user and stored in the internal memory 115. Alternatively, the application acquirer 11 may acquire the application 400 by downloading the application 400 from an external device via the network 111, or by reading the application 400 from a computer-readable recording medium.

The external storage 110 stores a plurality of software modules which execute a predetermined process, and a plurality of hardware modules which execute the same process as the process to be executed by one of the software modules. The external storage 110 stores the software modules and the hardware modules, with descriptions concerning the interfaces thereof being made identical to each other.

The module selector 12 selects modules required for the application 400 from the software modules and hardware modules stored in the external storage 110. The module selector 12 selects software modules and hardware modules which are specified in accordance with the functions of the application 400. Specifically, the module selector 12 retrieves the descriptions i.e. the interfaces 140 and 141 concerning the external operation specifications which are made identical among the individual modules in the external storage 110, and selects software modules and hardware modules which satisfy the external operation specifications specified in accordance with the functions of the application 400. It should be noted that there may be modules which are identical in the external operation specification, and are completely different in the internal operation specification. In view of this, the module selector 12 selects the modules, whose descriptions (the circuit configuration describer 200 and the program describer 300) relating to the internal operation specifications of the individual modules selected based on a judgment that their external operation specifications are identical, are identical to the internal operation specifications specified in accordance with the functions of the application 400. Thus, the module selector 12 selects the modules required for the application 400. In the case where the interface descriptions which are made identical are described in XML, the XML analyzer 13 may be activated to retrieve the interface descriptions.

The XML analyzer 13 analyzes syntaxes of XML documents of the software modules and the hardware modules selected by the module selector 12. The software modules and the hardware modules are described in XML. The XML analyzer 13 extracts functioning parts, the namespace identifiers, the attribute information and the like of the modules by analyzing the XML documents of the modules.

The namespace manager 14 acquires the namespace identifier of the software module and the namespace identifier of the hardware module.

The module mapping processor 15 implements either one of the software modules and the hardware modules in the target system, based on the namespace identifiers acquired by the namespace manager 14. Also, the module mapping processor 15 determines a mapping format to be used in implementing either one of the software modules and the hardware modules in the target system based on the namespace identifiers, determines a mapping format based on the namespace identifiers and the attribute information, if the determined mapping format is in plural numbers, and implements either one of the software modules and the hardware modules in the target system in accordance with the determined mapping format. The attribute information representing the attribute of the module includes at least one of information representing a processing performance of the module, information representing a power consumption to be consumed by the module, and information representing whether an interface attribute is public or private.

The specification value calculator 16 calculates at least one of the power consumption, the circuit area size, and the processing time required for the entirety of the target system, based on at least one of the power consumptions, circuit area sizes, and the processing times included in the modules implemented in the target system by the module mapping processor 15.

The constraint storage 18 stores in advance at least one of a power consumption, a circuit area size, and a processing time, as constraint required for the target system.

The judger 17 judges whether the specification value calculated by the specification value calculator 16 satisfies the corresponding constraint stored in the constraint storage 18. The judger 17 outputs the target system to the display section 21, if it is judged that the specification value satisfies the constraint. If, on the other hand, it is judged that the specification value does not satisfy the constraint, the judger 17 notifies the module selector 12 of the judgment result. Upon receiving the judgment result that the specification value does not satisfy the constraint, the module selector 12 selects a replaceable module among the modules that have been implemented in the target system. For instance, if the module selector 12 selects a software module, the module selector 12 judges whether there is a hardware module which executes the same process as the process to be executed by the software module. If it is judged that there is the hardware module, the module selector 12 selects the software module as a replaceable module. Then, the module selector 12 replaces the replaceable module with another module i.e. the hardware module in this example. For instance, if it is judged that there is a hardware module that executes the same process as the process to be executed by the software module, the module selector 12 replaces the software module with the hardware module.

The priority input acceptor 19 accepts an input by the user concerning priorities of the respective constraints such as the power consumption, the circuit area size, and the processing time. Specifically, in the case where there are plural constraints, setting priorities to the respective constraints enables to select a more proper module. For instance, if there are two constraints i.e. the processing time and the power consumption, the priority of the processing time can be set higher than the priority of the power consumption. If there are constraints that the processing time is 0.5 second or shorter, and the power consumption is 2 W or less, the judger 17 judges that the target system satisfies the constraint, despite that the specification value calculator 16 calculates that the processing time required for the entirety of the target system is 0.4 second, and the power consumption is 3 W. In other words, since the priority of the processing time is higher than the priority of the power consumption, the judger 17 judges that the target system satisfies the constraint, as far as the calculated processing time satisfies the constraint concerning the processing time, although the calculated power consumption does not satisfy the constraint concerning the power consumption.

Alternatively, if there are plural constraints, the judger 17 may judge that the target system satisfies the constraints only if the specification values satisfy all the corresponding constraints.

The priority setter 20 sets the priorities of the constraints accepted by the priority input acceptor 19 to the respective corresponding constraints stored in the constraint storage 18. The display section 21 displays the target system if the judger 17 judges that the specification values satisfy the respective corresponding constraints.

The external storage 110 corresponds to an example of a module storage, the module selector 12 corresponds to an example of a module selector, the XML analyzer 13 and the namespace manager 14 correspond to an example of a namespace identifier acquirer, the module mapping processor 15 corresponds to an example of an implementer, the constraint storage 18 corresponds to an example of a constraint storage, the specification value calculator 16 corresponds to an example of a calculator, the judger 17 corresponds to an example of a judger, the display section 21 corresponds to an example of a presenter, and the priority input acceptor 19 and the priority setter 20 correspond to an example of a priority setter.

Figure 6:
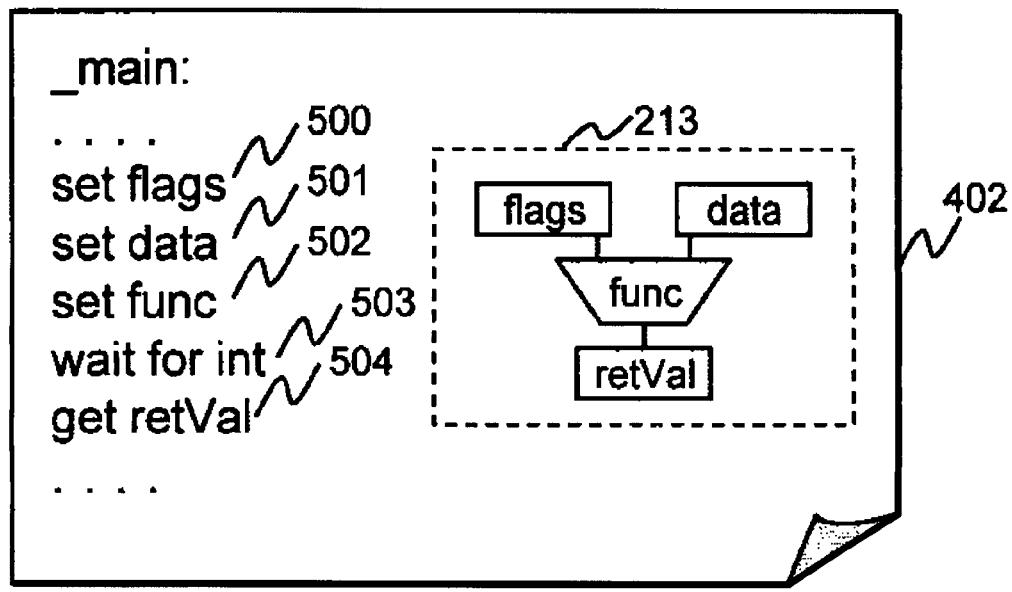
FIG. 6 is a diagram showing a mapping example in the case where an application in a software space utilizes a hardware module.

FIG. 6 is a diagram showing a mapping example in the case where the application 400 in the software space utilizes the hardware module 120. When a hardware module is activated from a software, for instance, as described in the third reference, the hardware module is mapped to a sequence comprised of setting an argument to a register, activating a hardware module, waiting for interrupt to obtain a processing result (synchronization), and acquiring a return value from the register. Thus, the application 400 is mapped to the target system 402 represented by the following processes (1) through (4).

(1) in the processes 500 and 501, a first argument and a second argument are set to the registers;

(2) in the process 502, the hardware module 120 i.e. the circuit diagram 213 is activated;

(3) in the process 503, the application 400 in the software space is brought to an interrupt waiting state; and (4) after an interrupt, in the process 504, a return value is acquired from the register.

It is possible to change the process (3) to polling of the register, for instance, depending on the kinds of hardware modules or applications.

Figure 7:
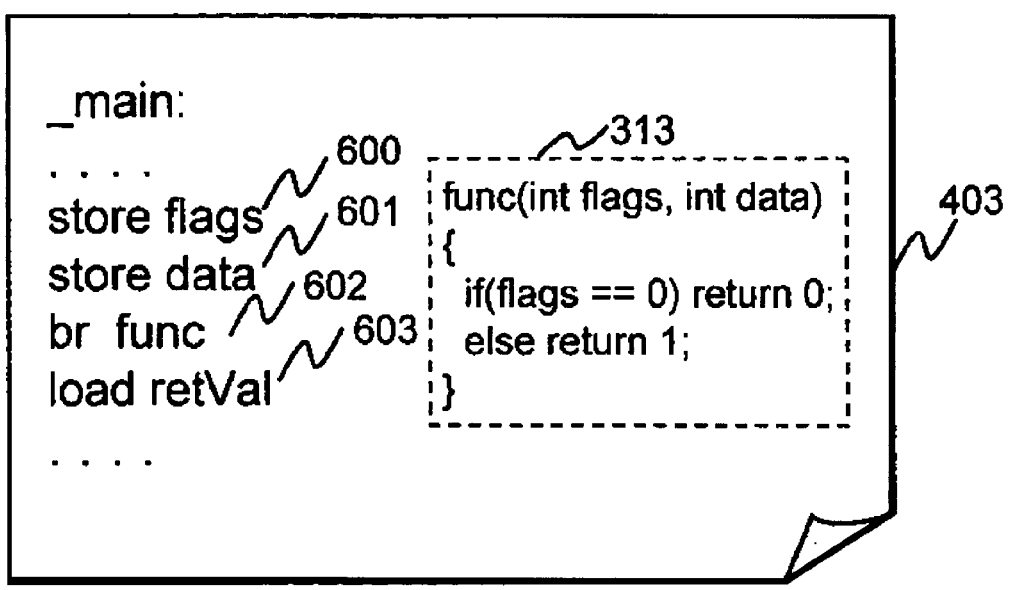
FIG. 7 is a diagram showing a mapping example in the case where an application in a software space utilizes a software module.

In the case where reference is made from a module or the application in the software space to a module in the software space, conversion to a function call using designated arguments and a return value is performed. FIG. 7 is a diagram showing a mapping example in the case where the application 400 in the software space utilizes the software module 130. In the case where a software module is activated from a software, the software module can be simply mapped to a function call or a message communication. Thus, the application 400 is mapped to the target system 403 represented by the following processes (1) through (3).

(1) in the processes 600 and 601, a first argument and a second argument are stored in a stack;

(2) in the process 602, a subroutine call is executed i.e. the program code 313 is activated; and (3) after returning from the subroutine, in the process 603, a processing result is obtained;

In the case where reference is made from a module or an application in the hardware space to a module in the software space, normally, the software module is activated, using an interrupt. Thus, the application 400 is mapped to the target system represented by the following processes (1) through (3).

(1) arguments required for the software module are stored in the registers;

(2) the software module is activated by causing an interrupt; and (3) after the process of the software module is completed, a return value is acquired from the register or a like element.

In the case where modules or applications in the hardware space are mutually referred to each other, normally, transmission and receiving arguments and a return value are executed by using a communication buffer prepared on the hardware such as queue, flip-flop, or register. Thus, the application 400 is mapped to the target system represented by the following processes (1) and (2).

(1) the hardware module as a referee is activated by storing arguments in the communication buffer; and (2) after the process of the referee hardware module is completed, the return value is acquired from the communication buffer.

As described in the embodiment, by switching over the methods for mapping the application 400 to the target system based on the namespace identifiers and the attribute information, the hardware modules and the software modules can be handled as identical modules in selecting modules and designing interfaces, and only in a final stage of implementing the modules in the target system, the configuration state of the interfaces for the hardware modules and the software modules can be specified.

As described above, there are several methods for mapping a hardware module and a software module. In this section, a mapping technique to be executed in the module mapping process 410 is described. FIG. 8 is a chart showing a representative example of the mapping method (or the mapping format) to be executed in the module mapping process 410 in accordance with the namespace information determined in the namespace management process 411.

In the case where the application 400 as a processing requestor is a software, and a referee module thereof is a software module, generally, a function call or a message communication is utilized. In using the function call, the module mapping processor 15 performs mapping to the process shown by the procedure 700 in FIG. 8. Since the procedure 700 is identical to the mapping method described referring to FIG. 7, description thereof is omitted herein. In using the message communication, the module mapping processor 15 performs mapping to the process shown by the procedure 701. Specifically, the application 400 is mapped to a sequence comprised of (1) transmitting a message, (2) proceeding to a message receiving wait state, and (3) acquiring a processing result from the received message.

In the case where the application 400 is a software, and a referee module thereof is a hardware module, interrupt waiting indicated by the procedure 702 or polling indicated by the procedure 703 is utilized. Since the procedure 702 is identical to the mapping method described referring to FIG. 6, description thereof is omitted herein. The procedure 703 is a mapping method of polling the register and waiting for completion of the process, without waiting for completion of the process in an interrupt waiting state. In other words, this is an appropriate method in adopting a hardware module capable of completing the process in a short time. In using the polling, the module mapping processor 15 performs mapping to the process shown by the procedure 703. Specifically, the application 400 is mapped to a sequence comprised of (1) storing arguments in the registers, (2) activating the hardware by storing a command in a control register, (3) polling a state register until the process is completed, and (4) acquiring a processing result from the register.

In the case where the application 400 is a hardware, and a referee module thereof is a software module, it is suitable to apply a mapping method of activating the software by interrupt indicated by the procedure 704. Specifically, the mapping method may be executed by setting an argument group in a temporary storage area such as the register, and by activating the targeted software module by causing an interrupt. Thereafter, the process of the application 400 may be resumed at a timing when the software module stores a processing result in the register or a like element.

In the case where the application 400 is a hardware, and a referee module thereof is a hardware module, normally, it is suitable to apply a mapping method of executing transmission and receiving arguments and a return value, using the communication buffer indicated by the procedure 705. In this method, an input buffer and an output buffer are prepared between the hardware modules. Then, arguments are written in the input buffer, and the referee hardware module is activated. After the process of the referee hardware module is completed, a processing result i.e. a return value is acquired from the output buffer.

FIG. 9 is a flowchart showing a process procedure of the module mapping processor 15. The module mapping processor 15 acquires namespace information from the namespace manager 14 (Step S1). Then, the module mapping processor 15 implements a target system in accordance with a mapping method corresponding to the acquired namespace information (Step S2).

As mentioned above, by changing the mapping method in accordance with the namespace information, the interface configuration state can be specified only in a final stage of implementing the modules in the target system. However, in the examples shown in FIGS. 8 and 9, the namespace information cannot be specified merely based on the contents of the namespace identifiers 142 and 143. In other words, it is necessary to judge the other attribute information, in addition to the definition contents of the namespace identifiers 142 and 143 concerning the software module and the hardware module, and to specify the final namespace information.

FIG. 10 is a chart for describing a namespace specifying process of specifying the namespace information.

For instance, as shown in FIG. 8, in the case where the application 400 is a software, and a referee module thereof is a hardware module, there are proposed a mapping method of waiting for completion of a process in an interrupt waiting state, and a mapping method of waiting for completion of a process by polling a register. A judgment as to which one of these mapping methods is to be applied can be made based on a judgment as to whether a hardware module capable of completing the process in a short time has been adopted. For instance, as shown by the procedure 902 in FIG. 10, the namespace manager 14 specifies that the application 400 is in a namespace of interrupt waiting, if a processing time is longer than a predetermined value. On the contrary, as indicated by the process 903, if the processing time is equal to or shorter than the predetermined time, the namespace manager 14 specifies that the application 400 is in a namespace of polling.

Also, in making mutual reference between the software modules, for instance, in the case where the interface attribute is a private function, the namespace manager 14 judges that the application 400 is in a namespace of function call (procedure 900). In the case where the interface attribute is a public function, the namespace manager 14 judges that the application 400 is in a namespace of message transmission and receiving (procedure 901). In this way, in the case where the namespace information cannot be identified merely based on the namespace identifier identifying either one of the software modules and the hardware modules, a judgment is made using the other attribute information.

Referring to FIG. 10, in the case where a hardware module refers to a software module, and in the case where hardware modules are mutually referred to each other, it is possible to uniquely specify the namespace information merely based on the namespace identifiers (procedures 904 and 905).

FIG. 11 is a flowchart showing the namespace management process 411. First, the namespace manager 14 acquires an analysis result of the XML tag from the XML analyzer 13 (Step S11). Then, as shown in FIG. 10, the namespace manager 14 determines the current namespace information, based on the analysis result of the XML tag and the kind of application (Step S12). Then, the namespace manager 14 notifies the module mapping processor 15 of the determined namespace information (Step S13). Thereby, the module mapping processor 15 implements a target system in accordance with the mapping method corresponding to the notified namespace information.

With use of the above configuration, the embodiment can be applied to various arrangements including an arrangement that the namespace information cannot be specified merely based on the namespace identifiers 142 and 143, and an arrangement that the definitions of the namespace identifiers 142 and 143 themselves do not exist.

With use of the aforementioned means, a target system can be implemented irrespective of the condition that the selected module is a software module or a hardware module, without the need of changing the other module constituting the system in the system designing stage. However, in the case where there are plural hardware modules and software modules which execute identical process, it is necessary to select modules that satisfy the constraint file 401 for implementation. In view of this, in the following, a process of the entirety of the design supporting system 100 for executing the process is described referring to FIG. 12.

Figure 12:
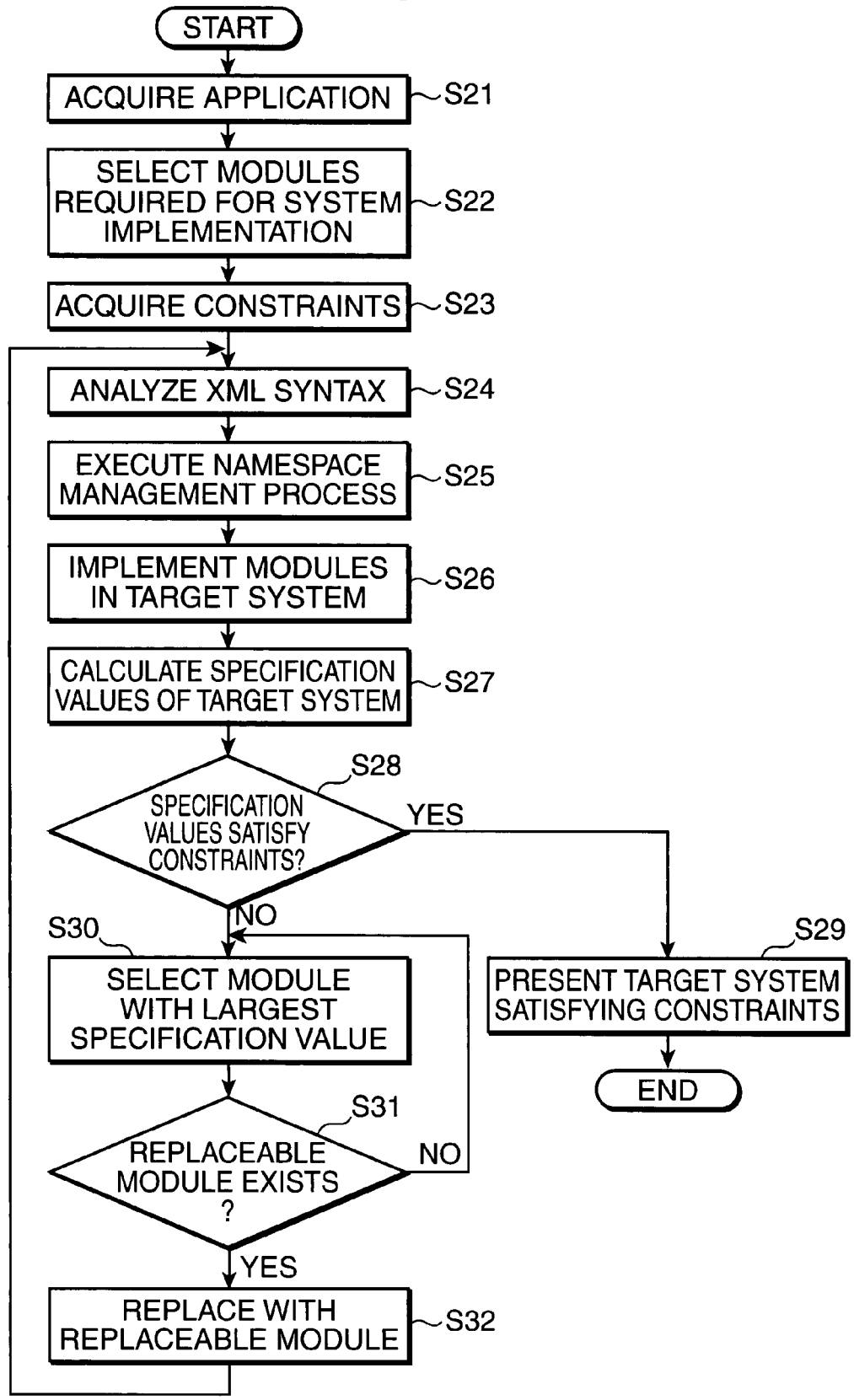
FIG. 12 is a flowchart for describing an example of a process to be executed by the design supporting system according to the embodiment.

FIG. 12 is a flowchart for describing an example of the process to be executed by the design supporting system 100 according to the embodiment.

First, the application acquirer 11 acquires the application 400 representing a target system to be built (Step S21). Then, the module selector 12 selects modules required for the application 400 from the hardware modules 120 through 122, and the software modules 130 through 132, which are stored in the external storage 110 (Step S22). The module selector 12 can select the modules required for the application 400 by retrieving the interfaces of the respective modules, and by selecting the modules that satisfy the external operation specification and the internal operation specification of the application 400.

Then, the judger 17 acquires the constraints i.e. the circuit area size, the power consumption, and the processing time of the target system described in the constraint storage 18 (Step S23). Then, the XML analyzer 13 analyzes the XML syntaxes of the hardware modules and the software modules selected by the module selector 12 (Step S24).

Then, the namespace manager 14 determines the namespace information of the respective modules, based on the namespace identifiers and the attribute information extracted by the XML analyzer 13 (Step S25). For instance, if the process requestor is a software module, the process requestee is a software module, and the interface attribute, which is one of the attribute information, is private, the namespace manager 14 determines that the namespace information is function call. If the process requestor is a software module, the process requestee is a software module, and the interface attribute, which is one of the attribute information, is public, the namespace manager 14 determines that the namespace information is message transmission. If the process requestor is a software module, the process requestee is a hardware module, and the processing time, which is one of the attribute information, is larger than a preset value, the namespace manager 14 determines that the namespace information is interrupt waiting. If the process requestor is a software module, the process requestee is a hardware module, and the processing time, which is one of the attribute information, is equal to or smaller than the preset value, the namespace manager 14 determines that the namespace information is polling.

If the process requestor is a hardware module, and the process requestee is a software module, the namespace manager 14 determines that the namespace information is interrupt. If the process requestor is a hardware module, and the process requestee is a hardware module, the namespace manager 14 determines that the namespace information is communication buffering.

Then, the module mapping processor 15 implements the selected modules in the target system, based on the namespace information determined by the namespace manager 14 (Step S26).

In this state, the selected modules each has specification values i.e. a circuit area size, a power consumption, and a processing time, as described above referring to FIGS. 2 and 3. The specification value calculator 16 calculates the specification values e.g. the circuit area size, the power consumption, and the processing time required for the entirety of the target system in accordance with the contents of the implemented target system (Step S27). For instance, the circuit area size required for the entirety of the target system can be obtained by calculating the sum of the circuit area sizes of all the selected hardware modules. The power consumption required for the entirety of the target system can be obtained by integrating the unit power consumptions of the selected hardware modules, and the processing times of the software modules and the hardware modules. The processing time required for the entirety of the target system can be obtained by calculating a critical path constituting a longest processing time in the target system.

Then, the judger 17 compares the specification values required for the entirety of the target system with the acquired constraints, and judges whether the specification values satisfy the constraints (Step S28). If it is judged that the specification values satisfy the constraints (YES in Step S28), the judger 17 causes the display section 21 to display the target system, because the target system is an intended embedded computer system (Step S29). Alternatively, the judger 17 may store, in a memory, the target system whose specification values are judged to satisfy the constraints.

If, on the other hand, it is judged that the specification values do not satisfy the constraints (NO in Step S28), the module selector 12 selects a module having a largest specification value as a designated constraint from the selected modules (Step S30). Then, the module selector 12 judges whether the module with the largest specification value can be replaced by another module in the external storage 110 (Step S31). If it is judged that there is no replaceable module in the external storage 110 (NO in Step S31), the routine returns to the process of Step S30, and the module selector 12 selects another module from the external storage 110. In the case where the routine returns to the process of Step S30 based on a judgment that there is no replaceable module, the module selector 12 selects a module having a second largest specification value. In this way, the module selector 12 selects a module whose specification value is consecutively decreased each time the routine returns to the process of Step S30.

If, on the other hand, it is judged that there is a replaceable module in the external storage 110 (YES in Step S31), the module selector 12 selects the replaceable module for replacement (Step S32). Then, the routine returns to the process of Step S24. Then, the XML analyzer 13 analyzes the XML syntax of the replaced module, and implements the re-selected modules in the target system. Thereafter, the processes after Step S24 are executed. By cyclically repeating the above processes, the entirety of the process of the design supporting system 100 is ended upon implementation of the target system that satisfies the constraints.

Execution of the module selecting process 413 shown in FIG. 12 enables to automatically implement the target system satisfying the constraints defined in the constraint file 401.

Executing the process of FIG. 12 enables to automatically implement the target system. However, this results in presenting the user with the target system that has been built for the first time. Accordingly, there is no guarantee that the presented target system is an optimum system with possible minimal circuit area size, power consumption, and processing time. In view of this, a modification to be described below proposes a configuration, in which various target systems satisfying the constraints are presented to the user, and the user is allowed to select an optimum target system among the presented target systems.

Figure 13:
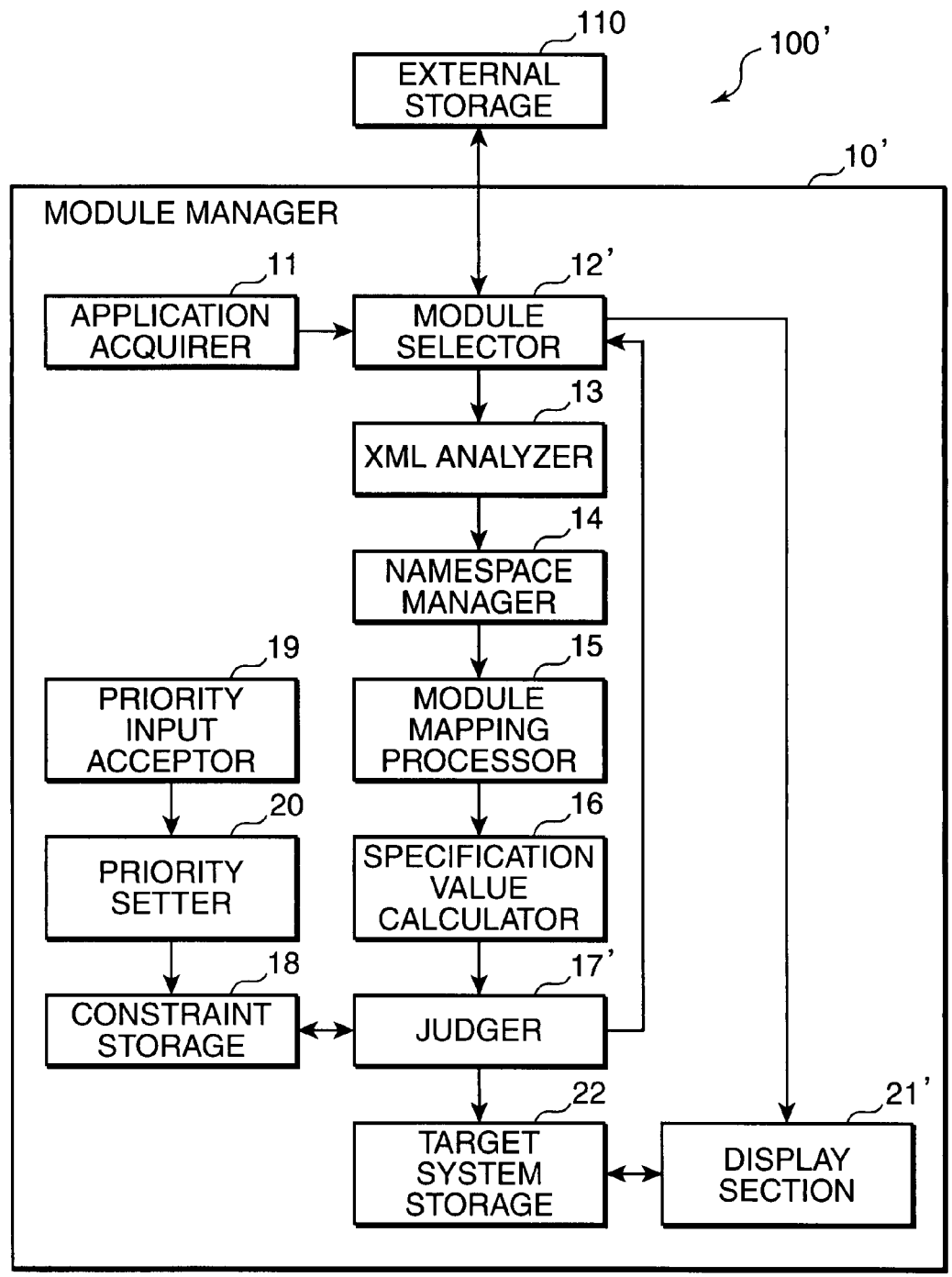
FIG. 13 is a block diagram showing a configuration of a design supporting system according to a modified embodiment.

FIG. 13 is a block diagram showing a configuration of a design supporting system according to the modified embodiment of the invention. The elements in FIG. 13 which are identical to those of the design supporting system 100 shown in FIG. 5 are denoted at the same reference numerals, and description thereof will be omitted herein. The design supporting system 100' includes an external storage 110 and a module manager 10'. The module manager 10' includes an application acquirer 11, a module selector 12', an XML analyzer 13, a namespace manager 14, a module mapping processor 15, a specification value calculator 16, a judger 17', a constraint storage 18, a priority input acceptor 19, a priority setter 20, a display section 21', and a target system storage 22.

The judger 17' judges whether the specification values calculated by the specification value calculator 16 satisfy the constraints stored in the constraint storage 18. If it is judged that the specification values satisfy the constraints, the judger 17' stores the target system in the target system storage 22. In the case where the target system is stored in the target system storage 22, or it is judged that the specification values do not satisfy the constraints, the judger 17' notifies the module selector 12' accordingly. Upon receiving the notification that the target system has been stored or the specification values do not satisfy the constraints, the module selector 12' selects a replaceable module from the modules implemented in the target system. Then, the module selector 12' replaces the replaceable module with another module stored in the external storage 110.

The target system storage 22 stores therein target systems whose specification values are judged to satisfy the constraints by the judger 17'.

The module selector 12' judges whether there is a replaceable module. If it is judged that there is no replaceable module, the module selector 12' causes the display section 21' to display all the target systems stored in the target system storage 22.

The display section 21' reads all the target systems stored in the target system storage 22 for displaying in the form of a list.

Figure 14:
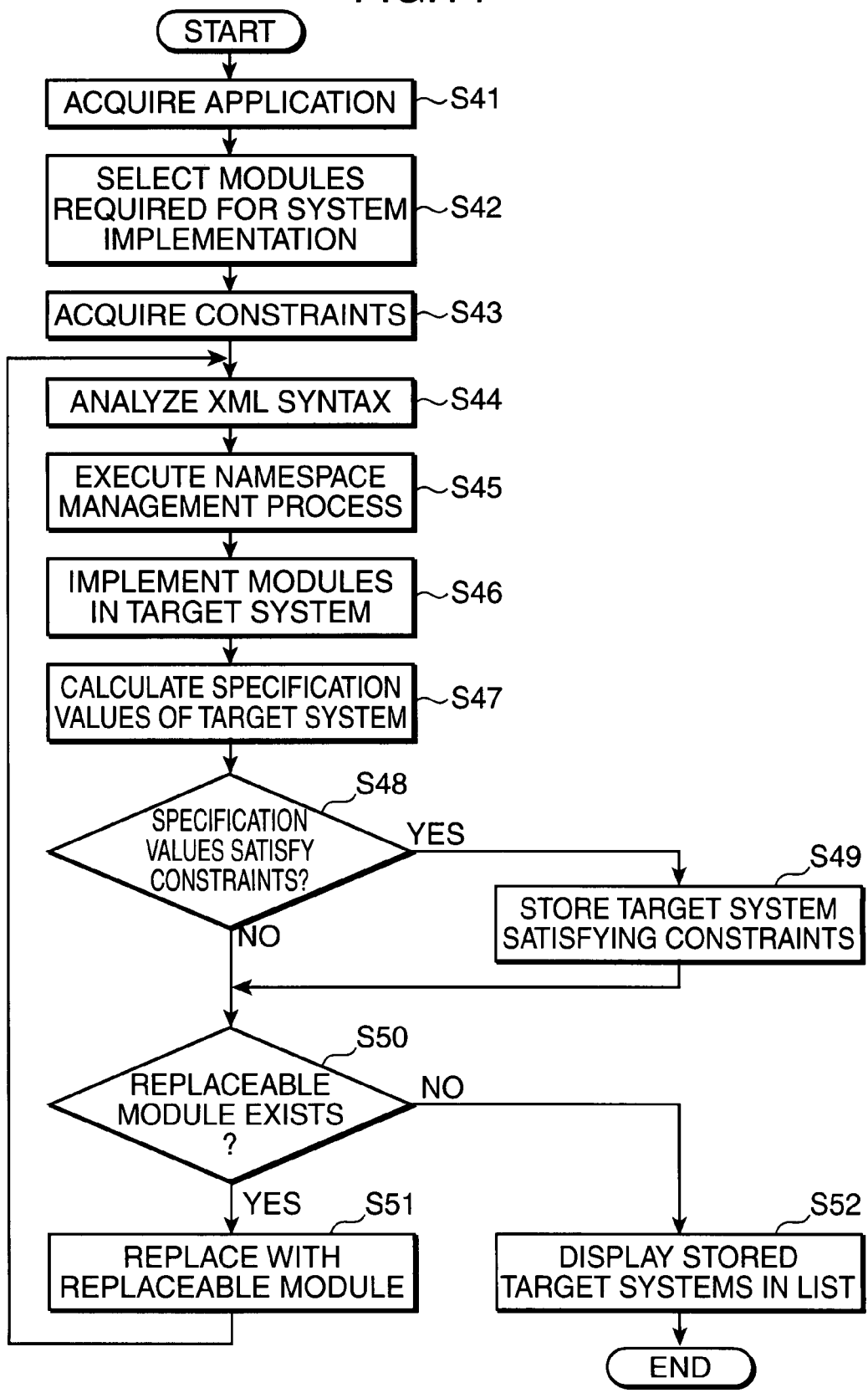
FIG. 14 is a flowchart for describing an example of a process to be executed by the design supporting system according to the modified embodiment.

Now, an example of a process to be executed by the design supporting system 100' according to the modified embodiment is described. FIG. 14 is a flowchart for describing the example of the process to be executed by the design supporting system according to the modified embodiment.

Referring to FIG. 14, since the processes of Steps S41 through S48, and S51 are identical to those of Steps S21 through S28, and S32 shown in FIG. 12, description thereof will be omitted herein. In Step S48, if it is judged that the specification values satisfy the constraints (YES in Step S48), the judger 17' stores the target system satisfying the constraints in the target system storage 22 (Step S49). Then, the module selector 12' judges whether there is a replaceable module which is replaceable with one of the hardware modules and the software modules constituting the target system is in the external storage 110 (Step S50).

If it is judged that there is the replaceable module in the external storage 110 (YES in Step S50), the module selector 12' replaces the replaceable module with one of the hardware modules and the software modules constituting the target system (Step S51). Then, the routine returns to the process of Step S44, and the XML analyzer 13 analyzes the XML syntax of the replaced module. Thereafter, the processes after Step S44 are executed. Thus, all the target systems satisfying the constraints can be selected by cyclically repeating the implementation until there is no replaceable module.

If, on the other hand, it is judged that is no replaceable module in the external storage 110 (NO in Step S50), the display section 21' displays the target systems stored in the target system storage 22 sequentially in the form of a list from the target system with possible minimal circuit area size, power consumption, and processing time (Step S52). Thus, the user is allowed to select and build an optimal built-in computer system.

In the process flow shown in FIG. 14, all the target systems satisfying the constraints are selected. Accordingly, as compared with the process flow shown in FIG. 12, the processing time of the module selecting process 413 may be extended. In the case where an extremely long time is required for implementation of a target system, it may be desirable to select the process flow shown in FIG. 12.

In the embodiment, the specification values concerning the entirety of the implemented target system are compared with the constraints. The invention is not specifically limited to the above. Alternatively, constraints concerning each of the modules may be stored in advance in the constraint storage, and the module selector 12 may compare at least one of the power consumption, the circuit area size, and the processing time included in the software modules and the hardware modules with the constraints stored in the constraint storage for selecting a module satisfying the constraints. In the altered arrangement, similarly to the embodiment, priorities may be set to the constraints. Specifically, in the case where more than one module among the software modules and the hardware modules satisfies the constraints, a module satisfying the constraints with a higher priority may be selected.

In the following, the target system to be built by the design supporting system 100 embodying the invention is described in detail. FIG. 15 is a diagram showing an example of a configuration of a target system i.e. an embedded system built by the design supporting system embodying the invention.

Referring to FIG. 15, an embedded system 30 includes a CPU 31, a memory 32, a first dedicated hardware 33, a second dedicated hardware 34, an internal bus 35, and a peripheral bus 36. The CPU 31 is connected to the memory 32, the first dedicated hardware 33, and the second dedicated hardware 34 via the internal bus 35. Also, the memory 32, the first dedicated hardware 33, and the second dedicated hardware 34 are interactively connected via the peripheral bus 36.

The first dedicated hardware 33 and the second dedicated hardware 34 are hardware modules selected by the design supporting system 100. The memory 32 stores a first software 37 and a second software 38. The first software 37 and the second software 38 are software modules selected by the design supporting system 100.

The CPU 31 reads the first software 37 and the second software 38 sequentially from the memory 32 for execution.

For instance, in the case where the process requestor is the first software 37, and the process requestee is the second software 38, function call or message transmission is executed from the first software 37 to the second software 38. In the case where the process requestor is the first software 37, and the process requestee is the second dedicated hardware 34, interrupt waiting or polling is executed from the first software 37 to the second dedicated hardware 34. In the case where the process requestor is the first dedicated hardware 33, and the process requestee is the first software 37, interrupt notification is executed from the first dedicated hardware 33 to the first software 37. In the case where the process requestor is the first dedicated hardware 33, and the process requestee is the second dedicated hardware 34, communication buffering is executed from the first dedicated hardware 33 to the second dedicated hardware 34.

With use of the configuration of the design supporting system according to the embodiment, the selected module can be implemented irrespective of the condition that the selected module is a software module or a hardware module, without the need of changing the other modules constituting the system in a system designing stage. The embodiment is made based on an idea that the system design support is applied to the technical field of embedded computers such as information appliances or cellular phones, wherein software modules and hardware modules are implemented. Alternatively, the invention may be applied to the technical field of information system constituted merely of software modules. In the alteration, it is possible to switch over interfaces such as a function call, a message communication, and a framework depending on namespace information.

The aforementioned embodiment may primarily include the invention having the following arrangements.

A design supporting system according to an aspect of the invention is a design supporting system for supporting designing a target system to be built by implementing at least one software module and at least one hardware module. The design supporting system comprises: a module storage for storing at least one software module including a namespace identifier for identifying the software module, and at least one hardware module including a namespace identifier for identifying the hardware module; a module selector for specifying a process of a target system to be built, and selecting the software modules and the hardware modules that execute the specified process from the module storage; a namespace identifier acquirer for acquiring the namespace identifier for identifying the software module selected by the module selector, and the namespace identifier for identifying the hardware module selected by the module selector; and an implementer for implementing either one of the software modules and the hardware modules in the target system, based on the namespace identifiers acquired by the namespace identifier acquirer.

A design supporting method according to another aspect of the invention is a design supporting method for supporting designing of a target system to be built by implementing at least one software module and at least one hardware module, wherein at least one software module including a namespace identifier for identifying the software module, and at least one hardware module including a namespace identifier for identifying the hardware module are stored in a module storage. The design supporting method comprises: a module selecting step of specifying a process of a target system to be built, and selecting the software modules and the hardware modules that execute the specified process from the module storage; a namespace identifier acquiring step of acquiring the namespace identifier for identifying the software module selected in the module selecting step, and the namespace identifier for identifying the hardware module selected in the module selecting step; and an implementing step of implementing either one of the software modules and the hardware modules in the target system, based on the namespace identifiers acquired in the namespace identifier acquiring step.

A computer-readable recording medium according to yet another aspect of the invention is a computer-readable recording medium recorded with a design supporting program for supporting designing a target system to be built by implementing at least one software module and at least one hardware module. The design supporting program causes a computer to function as: a module selecting means for specifying a process of a target system to be built, and selecting at least one software module and at least one hardware module that execute the specified process by referring to a module storage storing the software modules including a namespace identifier for identifying the software module, and the hardware modules including a namespace identifier for identifying the hardware module; a namespace identifier acquiring means for acquiring the namespace identifier for identifying the software module selected by the module selecting means, and the namespace identifier for identifying the hardware module selected by the module selecting means; and an implementing means for implementing either one of the software modules and the hardware modules in the target system, based on the namespace identifiers acquired by the namespace identifier acquiring means.

In the aforementioned arrangements, the module storage stores the software modules including the namespace identifier for identifying the software module, and the hardware modules including the namespace identifier for identifying the hardware module. The process of the target system to be built is specified, and the software modules and the hardware modules that execute the specified process is selected from the module storage. Then, the namespace identifier for identifying the selected software module, and the namespace identifier for identifying the selected hardware module are acquired. Thereafter, either one of the software modules and the hardware modules is implemented in the target system based on the acquired namespace identifiers.

Since either one of the software modules and the hardware modules is implemented in the target system, based on the namespace identifiers included in the software modules and the hardware modules, an optimum target system can be designed by implementing the software modules and the hardware modules, without discriminating the software modules and the hardware modules one from the other.

Preferably, in the design supporting system, descriptions concerning an interface for the software module and an interface for the hardware module may be made identical to each other. In the arrangement, since the descriptions concerning the interface for the software module and the interface for the hardware module are made identical to each other, the modules can be integrally managed, without discriminating the software modules and the hardwares module one from the other. This enables to properly select required modules without considering the differences of interfaces.

Preferably, in the design supporting system, each of the software modules and the hardware modules may include attribute information representing an attribute thereof, and the implementer may determine a mapping format to be used in implementing the either one of the software modules and the hardware modules in the target system, based on the namespace identifiers, may determine the mapping format based on the namespace identifiers and the attribute information, if it is judged that the determined mapping format is in plural numbers, and may implement the either one of the software modules and the hardware modules in the target system in accordance with the determined mapping format.

In the above arrangement, each of the software modules and the hardware modules includes the attribute information representing the attribute thereof. The mapping format to be used in implementing either one of the software modules and the hardware modules in the target system is determined based on the namespace identifiers. Further, in the case where the determined mapping format is in plural numbers, the mapping format is determined based on the namespace identifiers and the attribute information. Then, either one of the software modules and the hardware modules is implemented in the target system in accordance with the determined mapping format. This enables to implement the modules in the target system in accordance with a proper mapping format.

Preferably, in the design supporting system, the attribute information may include at least one of information representing a processing performance of the module, information representing a power consumption of the module, and information representing whether an interface attribute is public or private.

In the above arrangement, the attribute information includes at least one of the information representing the processing performance of the module, the information representing the power consumption of the module, and the information representing whether the interface attribute is public or private. This enables to further finely determine the mapping format based on these information.

Preferably, in the design supporting system, each of the software modules and the hardware modules may further include a function thereof, input values to be received from another module, and output values to be notified to the another module, and the implementer may be operative to map, to the target system, an interrupt waiting sequence for executing a first process of storing the input values in registers provided in the target system, a second process of activating the second module, a third process of proceeding to an interrupt waiting state, and a fourth process of acquiring the output values by accepting an interrupt after a process of the second module is completed, in mapping, to the target system, a second module whose namespace identifier identifies the hardware module, while referring to a first module whose namespace identifier identifies the software module.

In the above arrangement, each of the software module and the hardware module further includes the function thereof, the input values to be received from the another module, and the output values to be notified to the another module. The interrupt waiting sequence for executing the first process of storing the input values in the registers provided in the target system, the second process of activating the second module, the third process of proceeding to the interrupt waiting state, and the fourth process of acquiring the output values by accepting the interrupt after the process of the second module is completed is mapped to the target system, in mapping the second module whose namespace identifier identifies the hardware module to the target system, while referring to the first module whose namespace identifier identifies the software module.

Accordingly, the software modules and the hardware modules can be handled as identical modules in selecting the modules, and the configuration state of the interfaces for the modules can be specified in implementing the modules in the target system. Further, the interrupt waiting sequence can be mapped to the target system in mapping the hardware module to the target system, while reference is made from the software module to the hardware module.

Preferably, in the design supporting system, each of the software module and the hardware module may further include a function thereof, input values to be received from another module, and output values to be notified to the another module, and the implementer may be operative to map, to the target system, a polling sequence for executing a first process of storing the input values in registers provided in the target system, a second process of activating the second module, a third process of polling the register until a process of the second module is completed, and a fourth process of acquiring the output values from the registers, in mapping, to the target system, a second module whose namespace identifier identifies the hardware module, while referring to a first module whose namespace identifier identifies the software module.

In the above arrangement, each of the software modules and the hardware modules further includes the function thereof, the input values to be received from the another module, and the output values to be notified to the another module. The polling sequence for executing the first process of storing the input values in the registers provided in the target system, the second process of activating the second module, the third process of polling the register until the process of the second module is completed, and the fourth process of acquiring the output values from the registers is mapped to the target system, in mapping the second module whose namespace identifier identifies the hardware module to the target system, while referring to the first module whose namespace identifier identifies the software module.

Accordingly, the software modules and the hardware modules can be handled as identical modules in selecting the modules, and the configuration state of the interfaces for the modules can be specified in implementing the modules in the target system. Further, the polling sequence can be mapped to the target system in mapping the hardware module to the target system, while reference is made from the software module to the hardware module.

Preferably, in the design supporting system, each of the software modules and the hardware modules may further include a function thereof, input values to be received from another module, and output values to be notified to the another module, and the implementer may be operative to map, to the target system, a function call sequence for executing a first process of storing the input values as arguments in a stack provided in the target system, a second process of calling the second module, and a third process of acquiring the output values as return values, in mapping, to the target system, a second module whose namespace identifier identifies the software module, while referring to a first module whose namespace identifier identifies the software module.

In the above arrangement, each of the software modules and the hardware modules further includes the function thereof, the input values to be received from the another module, and the output values to be notified to the another module. The function call sequence for executing the first process of storing the input values as the arguments in the stack provided in the target system, the second process of calling the second module, and the third process of acquiring the output values as the return values is mapped to the target system, in mapping the second module whose namespace identifier identifies the software module to the target system, while referring to the first module whose namespace identifier identifies the software module.

Accordingly, the software modules and the hardware modules can be handled as identical modules in selecting the modules, and the configuration state of the interfaces for the modules can be specified in implementing the modules in the target system. Further, the function call sequence can be mapped to the target system in mapping the software module to the target system, while reference is made from the software module to the software module.

Preferably, in the design supporting system, each of the software modules and the hardware modules may further include a function thereof, input values to be received from another module in the module storage, and output values to be notified to the another module, and the implementer may be operative to map, to the target system, a message passing sequence for executing a first process of passing the input values as a message, a second process of proceeding to a message receiving wait state, and a third process of acquiring the output values from the received message, in mapping, to the target system, a second module whose namespace identifier identifies the software module, while referring to a first module whose namespace identifier identifies the software module.

In the above arrangement, each of the software modules and the hardware modules further includes the function thereof, the input values to be received from the another module, and the output values to be notified to the another module. The message passing sequence for executing the first process of passing the input values as the message, the second process of proceeding to the message receiving wait state, and the third process of acquiring the output values from the received message is mapped to the target system, in mapping the second module whose namespace identifier identifies the software module to the target system, while referring to the first module whose namespace identifier identifies the software module.

Accordingly, the software modules and the hardware modules can be handled as identical modules in selecting the modules, and the configuration state of the interfaces for the modules can be specified in implementing the modules in the target system. Further, the message passing sequence can be mapped to the target system in mapping the software module to the target system, while reference is made from the software module to the software module.

Preferably, in the design supporting system, each of the software modules and the hardware modules may further include a function thereof, input values to be received from another module, and output values to be notified to the another module, and the implementer may be operative to map, to the target system, an interrupt sequence for executing a first process of storing the input values in registers provided in the target system, a second process of activating the second module by causing an interrupt, and a third process of acquiring the output values from the registers after a process of the second module is completed, in mapping, to the target system, a second module whose namespace identifier identifies the software module, while referring to a first module whose namespace identifier identifies the hardware module.

In the above arrangement, each of the software modules and the hardware modules further includes the function thereof, the input values to be received from the another module, and the output values to be notified to the another module. The interrupt sequence for executing the first process of storing the input values in the registers provided in the target system, the second process of activating the second module by causing the interrupt, and the third process of acquiring the output values from the registers after the process of the second module is completed is mapped to the target system, in mapping the second module whose namespace identifier identifies the software module to the target system, while referring to the first module whose namespace identifier identifies the hardware module.

Accordingly, the software modules and the hardware modules can be handled as identical modules in selecting the modules, and the configuration state of the interfaces for the modules can be specified in implementing the modules in the target system. Further, the interrupt sequence can be mapped to the target system in mapping the software module to the target system, while reference is made from the hardware module to the software module.

Preferably, in the design supporting system, each of the software modules and the hardware modules may further include a function thereof, input values to be received from another module, and output values to be notified to the another module, and the implementer may be operative to map, to the target system, a buffering sequence for executing a first process of activating the second module by storing the input values in a buffer provided in the target system, and a second process of acquiring the output values from the buffer after a process of the second module is completed, in mapping, to the target system, a second module whose namespace identifier identifies the hardware module, while referring to a first module whose namespace identifier identifies the hardware module.

In the above arrangement, each of the software modules and the hardware modules further includes the function thereof, the input values to be received from the another module, and the output values to be notified to the another module. The buffering sequence for executing the first process of activating the second module by storing the input values in the buffer provided in the target system, and the second process of acquiring the output values from the buffer after the process of the second module is completed is mapped to the target system, in mapping the second module whose namespace identifier identifies the hardware module to the target system, while referring to the first module whose namespace identifier identifies the hardware module.

Accordingly, the software modules and the hardware modules can be handled as identical modules in selecting the modules, and the configuration state of the interfaces for the modules can be specified in implementing the modules in the target system. Further, the buffering sequence can be mapped to the target system in mapping the hardware module to the target system, while reference is made from the hardware module to the hardware module.

Preferably, in the design supporting system, each of the software modules and the hardware modules may include at least one of a power consumption of the module, a circuit area size of the module, and a processing time of the module, and the design supporting system may further include: a constraint storage for storing in advance at least one of a power consumption, a circuit area size, and a processing time, as a constraint required for the target system; a calculator for calculating at least one of a power consumption, a circuit area size, and a processing time required for the entirety of the target system, as a specification value, based on at least one of power consumptions, circuit area sizes, and processing times included in the modules implemented in the target system by the implementer; a nudger for judging whether the specification value calculated by the calculator satisfies the corresponding constraint stored in the constraint storage; and a presenter for presenting a user with the target system, if the judger judges that the specification value satisfies the constraint.

In the above arrangement, each of the software modules and the hardware modules includes at least one of the power consumption of the module, the circuit area size of the module, and the processing time of the module. At least one of the power consumption, the circuit area size, and the processing time is stored in advance in the constraint storage, as the constraint required for the target system. At least one of the power consumption, the circuit area size, and the processing time required for the entirety of the target system is calculated, as the specification value, based on at least one of the power consumptions, the circuit area sizes, and the processing times included in the modules implemented in the target system. A judgment is made as to whether the calculated specification value satisfies the corresponding constraint stored in the constraint storage. The target system is presented to the user, if it is judged that the specification value satisfies the constraint.

The above arrangement enables to design the target system with latitude, while satisfying the constraints required in designing the target system. Also, the arrangement enables to automatically design the target system satisfying the pre-stored constraints.

Preferably, in the design supporting system, the module selector may select a replaceable module from the modules implemented in the target system, if the judger judges that the specification value does not satisfy the constraint, to replace the selected replaceable module with another module in the module storage, and the implementer may implement the replaced another module in the target system.

In the above arrangement, if it is judged that the specification value does not satisfy the constraint, the replaceable module is selected from the modules implemented in the target system, the selected replaceable module is replaced by the another module, and the replaced another module is implemented in the target system.

Accordingly, even if the specification value does not satisfy the constraint, the another module whose specification value satisfies the constraint is selected, and the selected another module is implemented in the target system. This enables to automatically design the target system satisfying the constraint.

Preferably, the design supporting system may further comprise a priority setter for setting priorities of the respective constraints, if there are a plurality of the constraints. In this arrangement, the priorities of the respective constraints are set if there are the plurality of the constraints. This enables to implement proper modules depending on the priorities in the target system.

Preferably, in the design supporting system, each of the software modules and the hardware modules may include at least one of a power consumption of the module, a circuit area size of the module, and a processing time of the module, and the design supporting system may further include: a constraint storage for storing in advance at least one of a power consumption, a circuit area size, and a processing time, as a constraint required for the target system; a calculator for calculating at least one of a power consumption, a circuit area size, and a processing time required for the entirety of the target system, as a specification value, based on at least one of power consumptions, circuit area sizes, and processing times included in the modules implemented in the target system by the implementer; a judger for judging whether the specification value calculated by the calculator satisfies the corresponding constraint stored in the constraint storage; a target system storage for storing a plurality of the target systems, if the judger judges that the specification value satisfies the constraint, until it is judged that there is no replaceable module among the modules implemented in the corresponding target system; and a presenter for presenting a user with all the target systems stored in the target system storage.

In the above arrangement, each of the software modules and the hardware modules includes at least one of the power consumption of the module, the circuit area size of the module, and the processing time of the module. At least one of the power consumption, the circuit area size, and the processing time is stored in advance, as the constraint required for the target system. At least one of the power consumption, the circuit area size, and the processing time required for the entirety of the target system is calculated, as the specification value, based on at least one of the power consumptions, the circuit area sizes, and the processing times included in the modules implemented in the target system. A judgment is made as to whether the calculated specification value satisfies the corresponding constraint stored in the constraint storage. If it is judged that the specification value satisfies the constraint, the target system is stored in the target system storage until it is judged that there is no replaceable module among the modules implemented in the corresponding target system. Then, all the target systems stored in the target system storage are presented to the user.

With the above arrangement, since all the target systems each of which has the specification value satisfying the constraint are presented, the user can check the optimum target system.

Preferably, in the design supporting system, the presenter may present the user with the target systems stored in the target system storage in the order of satisfying the constraints.

In the above arrangement, since the target systems stored in the target system storage are presented to the user in the order of satisfying the constraints, the user can easily check the optimum target system.

This application is based on Japanese Patent Application No. 2006-111760 filed on Apr. 14, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A design supporting system for supporting design of a target system to be built by implementing at least one software module and at least one hardware module, the design supporting system comprising:
    a module storage for storing at least one software module including a namespace identifier for identifying the software module, and at least one hardware module including a namespace identifier for identifying the hardware module;
    a module selector for specifying a process of a target system to be built, and selecting software modules and hardware modules that execute the specified process from the module storage;
    a namespace identifier acquirer for acquiring namespace identifiers for identifying the software modules selected by the module selector, and the namespace identifiers for identifying the hardware modules selected by the module selector; and
    an implementer for implementing either one of the software modules and the hardware modules in the target system, based on the namespace identifiers acquired by the namespace identifier acquirer,
    wherein each of the software modules and the hardware modules include at least one of a power consumption of the corresponding module, a circuit area size of the corresponding module, and a processing time of the corresponding module, the design supporting system further comprising:
    a constraint storage for storing in advance at least one of a power consumption, a circuit area size, and a processing time, as a constraint required for the target system;
    a calculator for calculating at least one of a power consumption, a circuit area size, and a processing time required for an entirety of the target system, as a specification value, based on at least one of power consumptions, circuit area sizes, and processing times included in the software and hardware modules implemented in the target system by the implementer; and
    a judger for judging whether the specification value calculated by the calculator satisfies the corresponding constraint stored in the constraint storage.

2. The design supporting system according to claim 1, wherein
    descriptions concerning an interface for a software module and an interface for a hardware module are made identical to each other.

3. The design supporting system according to claim 1, wherein
    each of the software modules and the hardware modules includes attribute information representing an attribute thereof, and
    the implementer determines a mapping format to be used in implementing either one of the software modules and the hardware modules in the target system, based on the namespace identifiers, and the implementer determines the mapping format based on the namespace identifiers and the attribute information, if it is judged that the determined mapping format is in plural numbers, and implements the either one of the software modules and the hardware modules in the target system in accordance with the determined mapping format.

4. The design supporting system according to claim 3, wherein
    the attribute information includes at least one of information representing a processing performance of a module, information representing a power consumption of a module, and information representing whether an interface attribute is public or private.

5. The design supporting system according to claim 1, wherein
    each of the software modules and the hardware modules further includes a function thereof, input values to be received from another module, and output values to be notified to the other module, and
    the implementer is operative to map, to the target system, an interrupt waiting sequence for executing a first process of storing the input values in registers provided in the target system, a second process of activating a second module, a third process of proceeding to an interrupt waiting state, and a fourth process of acquiring the output values by accepting an interrupt after a process of the second module is completed, in mapping, to the target system, the second module whose namespace identifier identifies the hardware module, while referring to a first module whose namespace identifier identifies the software module.

6. The design supporting system according to claim 1, wherein
    each of the software modules and the hardware modules further includes a function thereof, input values to be received from another module, and output values to be notified to the other module, and
    the implementer is operative to map, to the target system, a polling sequence for executing a first process of storing the input values in registers provided in the target system, a second process of activating a second module, a third process of polling the register until a process of the second module is completed, and a fourth process of acquiring the output values from the registers, in mapping, to the target system, the second module whose namespace identifier identifies the hardware module, while referring to a first module whose namespace identifier identifies the software module.

7. The design supporting system according to claim 1, wherein
each of the software modules and the hardware modules further includes a function thereof, input values to be received from another module, and output values to be notified to the other module, and
the implementer is operative to map, to the target system, a function call sequence for executing a first process of storing the input values as arguments in a stack provided in the target system, a second process of calling a second module, and a third process of acquiring the output values as return values, in mapping, to the target system, the second module whose namespace identifier identifies the software module, while referring to a first module whose namespace identifier identifies the software module.

8. The design supporting system according to claim 1, wherein
each of the software modules and the hardware modules further includes a function thereof, input values to be received from another module, and output values to be notified to the other module, and
the implementer is operative to map, to the target system, a message passing sequence for executing a first process of passing the input values as a message, a second process of proceeding to a message receiving wait state, and a third process of acquiring the output values from the received message, in mapping, to the target system, a second module whose namespace identifier identifies the software module, while referring to a first module whose namespace identifier identifies the software module.

9. The design supporting system according to claim 1, wherein
each of the software modules and the hardware modules further includes a function thereof, input values to be received from another module, and output values to be notified to the other module, and
the implementer is operative to map, to the target system, an interrupt sequence for executing a first process of storing the input values in registers provided in the target system, a second process of activating a second module by causing an interrupt, and a third process of acquiring the output values from the registers after a process of the second module is completed, in mapping, to the target system, the second module whose namespace identifier identifies the software module, while referring to a first module whose namespace identifier identifies the hardware module.

10. The design supporting system according to claim 1, wherein
each of the software modules and the hardware modules further includes a function thereof, input values to be received from another module, and output values to be notified to the other module, and
the implementer is operative to map, to the target system, a buffering sequence for executing a first process of activating a second module by storing the input values in a buffer provided in the target system, and a second process of acquiring the output values from the buffer after a process of the second module is completed, in mapping, to the target system, the second module whose namespace identifier identifies the hardware module, while referring to a first module whose namespace identifier identifies the hardware module.

11. The design supporting system according to claim 1, further comprising:
a presenter for presenting a user with the target system, if the judger judges that the specification value satisfies the constraint.

12. The design supporting system according to claim 1, wherein the module selector selects a replaceable module from the modules implemented in the target system, if the judger judges that the specification value does not satisfy the constraint, to replace the selected replaceable module with another module in the module storage, and
the implementer implements the replaced another module in the target system.

13. The design supporting system according to claim 1, further comprising:
a priority setter for setting priorities of the respective constraints, if there are a plurality of the constraints.

14. The design supporting system according to claim 1, wherein
the design supporting system further includes:
a target system storage for storing a plurality of the target systems, if the judger judges that the specification value satisfies the constraint, until it is judged that there is no replaceable module among the modules implemented in the corresponding target system.

15. The design supporting system according to claim 14, further comprising:
a presenter for presenting a user with all the target systems stored in the target system storage.

16. The design supporting system according to claim 15, wherein the presenter presents the user with the target systems stored in the target system storage in the order of satisfying the constraints.

17. A design supporting method for supporting design of a target system to be built by implementing at least one software module and at least one hardware module, wherein software modules including namespace identifiers for identifying the software modules, and hardware modules including namespace identifiers for identifying the hardware modules are stored in a module storage, the design supporting method comprising:
a module selecting step of specifying, using a module selector, a process of a target system to be built, and selecting software modules and hardware modules that execute the specified process from the module storage;
a namespace identifier acquiring step of acquiring, using a namespace identifier acquirer, the namespace identifiers for identifying the software modules selected in the module selecting step, and the namespace identifiers for identifying the hardware modules selected in the module selecting step; and
an implementing step of implementing, using an implementer, either one of the software modules and the hardware modules in the target system, based on the namespace identifiers acquired in the namespace identifier acquiring step, wherein
each of the software modules and the hardware modules includes at least one of a power consumption of the corresponding module, a circuit area size of the corresponding module, and a processing time of the corresponding module, and at least one of a power consumption, a circuit area size, and a processing time is stored in advance in a constraint storage, as a constraint required for the target system, the design supporting method further comprising:

a calculating step of calculating at least one of a power consumption, a circuit area size, and a processing time required for an entirety of the target system, as a specification value, based on at least one of power consumptions, circuit area sizes, and processing times included in the modules implemented in the target system in the implementing step; and a judging step of judging whether the specification value calculated in the calculating step satisfies the corresponding constraint stored in the constraint storage.

18. A non-transitory computer-readable recording medium storing a design supporting program for supporting design of a target system to be built by implementing at least one software module and at least one hardware module, the design supporting program causing a computer to function as:

a module selector for specifying a process of a target system to be built, and selecting software modules and hardware modules that execute the specified process by referring to a module storage storing software modules including namespace identifiers for identifying the software modules, and hardware modules including namespace identifiers for identifying the hardware modules;

a namespace identifier acquirer for acquiring the namespace identifiers for identifying the software modules selected by the module selector, and the namespace identifiers for identifying the hardware modules selected by the module selector; and an implementer for implementing either one of the software modules and the hardware modules in the target system, based on the namespace identifiers acquired by the namespace identifier acquirer.

* * * * *